US 9,903,254 B2

(12) United States Patent
Shinagawa

(10) Patent No.: US 9,903,254 B2
(45) Date of Patent: Feb. 27, 2018

(54) OIL JET ABNORMALITY DETERMINATION APPARATUS OF INTERNAL COMBUSTION ENGINE AND CONTROL APPARATUS OF INTERNAL COMBUSTION ENGINE

(71) Applicant: Tomohiro Shinagawa, Shizuoka (JP)

(72) Inventor: Tomohiro Shinagawa, Shizuoka (JP)

(73) Assignee: TOYOTA JIDOSHA KABUSHIKI KAISHA, Toyota-shi (JP)

(*) Notice: Subject to any disclaimer, the term of this patent is extended or adjusted under 35 U.S.C. 154(b) by 157 days.

(21) Appl. No.: 14/765,441

(22) PCT Filed: Sep. 24, 2013

(86) PCT No.: PCT/JP2013/075644
§ 371 (c)(1),
(2) Date: Aug. 3, 2015

(87) PCT Pub. No.: WO2014/122817
PCT Pub. Date: Aug. 14, 2014

(65) Prior Publication Data
US 2015/0377115 A1    Dec. 31, 2015

(30) Foreign Application Priority Data
Feb. 5, 2013    (JP) .................................. 2013-020341

(51) Int. Cl.
*F01P 5/14*    (2006.01)
*F02M 51/00*    (2006.01)
(Continued)

(52) U.S. Cl.
CPC ................. *F01P 3/08* (2013.01); *F01M 1/08* (2013.01); *F01M 1/16* (2013.01); *F01P 11/14* (2013.01);
(Continued)

(58) Field of Classification Search
CPC ........ F01P 3/08; F01P 11/14; F01P 2003/006; F01P 3/06; F01P 2031/00; F02P 5/152;
(Continued)

(56) References Cited

U.S. PATENT DOCUMENTS 4,106,470 A * 8/1978 San Sebastian Saizar
................................. F01M 1/22
123/198 DB
4,487,180 A * 12/1984 Ito .......................... F02D 17/04
123/198 D
(Continued)

FOREIGN PATENT DOCUMENTS

JP    2003-083065 A    3/2003
JP    2008-038757 A    2/2008
(Continued)

*Primary Examiner* — Lindsay Low
*Assistant Examiner* — Syed O Hasan
(74) *Attorney, Agent, or Firm* — Andrews Kurth Kenyon LLP

(57) ABSTRACT

An MBT ignition time and a knock ignition time are acquired from an engine rotation speed and engine load, and an ignition time on a delay angle side, out of these ignition times, is set as the most advance angle ignition time. An ignition time on the delay angle side only by the KCS learning value with respect to the most advance angle ignition time is set as a required ignition time, and when an actual ignition time set by a knock control system exceeds a predetermined amount and is positioned on the delay angle side with respect to the required ignition time, it is determined that abnormality occurs in an oil jet. Fail-safe processing to the effect that the opening degrees of a throttle valve are corrected to a closed side is executed in response to the abnormality determination.

5 Claims, 14 Drawing Sheets

(51) Int. Cl.

| | | |
|---|---|---|
| *F01P 3/08* | (2006.01) | |
| *F02P 5/152* | (2006.01) | |
| *F01M 1/16* | (2006.01) | |
| *F01M 1/08* | (2006.01) | |
| *F02D 41/22* | (2006.01) | |
| *F02D 37/02* | (2006.01) | |
| *F02D 41/00* | (2006.01) | |
| *F01P 11/14* | (2006.01) | |
| *F02D 11/10* | (2006.01) | |
| *F01P 3/06* | (2006.01) | |
| *F01P 3/00* | (2006.01) | |

(52) U.S. Cl.
CPC ......... *F02D 37/02* (2013.01); *F02D 41/0002* (2013.01); *F02D 41/221* (2013.01); *F02P 5/152* (2013.01); *F01P 3/06* (2013.01); *F01P 2003/006* (2013.01); *F01P 2031/00* (2013.01); *F02D 11/10* (2013.01); *F02D 2041/224* (2013.01); *Y02T 10/42* (2013.01); *Y02T 10/46* (2013.01)

(58) Field of Classification Search
CPC ...... F02D 37/02; F02D 41/30; F02D 41/0002; F02D 11/10; F01M 1/08; F01M 1/16
USPC .............................. 123/478, 41.15, 305, 479
See application file for complete search history.

(56) References Cited

U.S. PATENT DOCUMENTS 8,739,746 B2 * 6/2014 Bidner ................ F01M 1/08
123/196 R
2009/0229561 A1 * 9/2009 Yamashita ............ F01M 1/16
123/196 R

FOREIGN PATENT DOCUMENTS

| JP | 2009-036036 A | 2/2009 |
| JP | 2009-270523 A | 11/2009 |
| JP | 2010-048159 A | 3/2010 |
| JP | 2010-270688 A | 12/2010 |
| JP | 2011-256725 A | 12/2011 |
| JP | 2012-097595 A | 5/2012 |

* cited by examiner

OIL JET ABNORMALITY DETERMINATION APPARATUS OF INTERNAL COMBUSTION ENGINE AND CONTROL APPARATUS OF INTERNAL COMBUSTION ENGINE

CROSS-REFERENCE TO RELATED APPLICATIONS

This is a national phase application based on the PCT International Patent Application No. PCT/JP2013/075644 filed Sep. 24, 2013, claiming priority to Japanese Patent Application No. 2013-020341 filed Feb. 5, 2013, the entire contents of which are incorporated herein by reference.

TECHNICAL FIELD

The present invention relates to an oil jet abnormality determination apparatus of an internal combustion engine that determines presence or absence of abnormality of an oil jet in the internal combustion engine. Also, the present invention relates to a control apparatus that controls the internal combustion engine in accordance with its determination results. In particular, the present invention relates to the improvement of an oil jet abnormality determination method.

BACKGROUND ART

Conventionally, an oil supply system that supplies engine oil (lubricating oil) to a portion to be lubricated or a portion to be cooled is provided in an engine mounted on an automobile and the like (see Patent Literature 1 and Patent Literature 2). Also, oil jet apparatuses have been known as instruments provided in the oil supply system. The oil jet apparatus injects the engine oil to the rear surface of a piston (hereinafter, the oil injection is referred to as "oil jet").

The oil jet apparatuses disclosed in Patent Literature 1 and Patent Literature 2 are configured to switch the execution and non-execution of the oil jet. For example, an oil jet switching valve is installed in the oil supply path of the oil jet apparatus. At the initial time of the start-up of the cooling an engine, and the like, the oil jet switching valve is closed, and the oil jet is stopped. In this manner, the improvement of the warm-up performance of the engine is achieved. Additionally, the atomization of fuel injected in cylinders is facilitated, thereby achieving the improvement of exhaust emission or the prevention of oil dilution (dilution of oil caused by the fuel). On the other hand, after the completion of the warm-up of the engine and the like, when engine load increases, the oil jet switching valve is opened, and the oil jet is executed. Accordingly, this cools the pistons, and suppresses the excessive increase in the in-cylinder temperature, thereby preventing the occurrence of knocking.

CITATION LIST

Patent Literature

PTL 1: Japanese Unexamined Patent Application Publication No. 2003-83065
PTL 2: Japanese Unexamined Patent Application Publication No. 2010-48159

SUMMARY OF INVENTION

Technical Problems

Incidentally, regarding one wherein the oil jet switching valve is opened and closed, and the execution and non-execution of the oil jet are switched, there is a case where the opening operation of the oil jet switching valve is not regularly performed, or the oil path used for performing the oil jet is blocked. In this case, the oil jet is disabled. Under the circumstances, failures such as the insufficient cooling of the pistons occur. For example, a case is assumed where the oil jet switching valve becomes fixed in a closed state.

Accordingly, an abnormality determination apparatus that can determine the presence or absence of the abnormality of the oil jet at an early stage with accuracy has been demanded.

It is noted that the causes for the fixing of the oil jet switching valve are attributed to the existence of deposits in the oil. Also, regarding one wherein the oil jet switching valve is opened and closed by use of an electromagnetic solenoid, the fixation is caused by the failure of the electromagnetic solenoid and the like.

As a method of determining the presence or absence of the abnormality of the oil jet, it is conceivable that a hydraulic pressure sensor is provided on the downstream side of the oil jet switching valve. That is, it is determined whether or not the switching of the oil jet switching valve is regularly carried out based on the variation in the hydraulic pressure detected by the hydraulic pressure sensor.

However, this requires to separately provide the hydraulic pressure sensor on the downstream side of the oil jet switching valve. In this case, it is difficult to secure an installation space for the hydraulic pressure sensor. Also, the installation operation of the hydraulic pressure sensor is troublesome. In view of these, this lacks practicality.

The present invention has been achieved in view of the above-mentioned problems. It is an object of the present invention to provide an oil jet abnormality determination apparatus and a control apparatus of an internal combustion engine, which can determine the presence or absence of the abnormality of oil jet with accuracy.

Solution to Problem

—Principle of Solution to the Problems—

Specifically, according to one aspect of the present invention, the principle of solution of the present invention to achieve the above object is such that, when an abnormality occurs in the oil jet, and the in-cylinder temperature is increased, it is presupposed that the knocking of an engine occurs at an early time (the knocking occurs on the delay angle side of an ignition time compared with a case where the oil jet is regularly performed), and the ignition time is transferred to the delay angle side. Then, the presence or absence of the abnormality of the oil jet is determined (whether or not a state occurs where the oil jet is not executed, irrespective of the instruction of the execution of the oil jet) based on the transfer amount (delay angle amount) of the ignition time to the delay angle side.

—Solution Means—

Specifically, the present invention has a subject matter regarding an oil jet abnormality determination apparatus of an internal combustion engine that is configured to perform an oil jet that lowers an in-cylinder temperature and perform an ignition time control in which an ignition time of a sparking plug is delayed when knocking occurs. Regarding the oil jet abnormality determination apparatus, when a delay angle amount of the ignition time of the sparking plug exceeds a predetermined determination threshold value, it is configured to determine that an abnormal state where an oil jet amount runs short occurs.

Based on this specific matter, in the operational state of the internal combustion engine, in which the oil jet that is aimed at lowering the in-cylinder temperature is carried out, when, for some reasons, a state is brought where the oil jet is disabled, or where the amount of oil jet is not sufficiently obtained, a situation is developed, in which the knocking occurs in response to an increase in the in-cylinder temperature at an early time (which is earlier, compared with a case where the oil jet is regularly performed). In this case, the ignition time of the sparking plug is delayed under the ignition time control, but the ignition time (actual ignition time) is substantially transferred to the delay angle side, compared with the case where the oil jet is regularly performed. Accordingly, in a situation in which the actual ignition time exceeds a predetermined determination threshold value, the in-cylinder temperature is substantially increased. It is determined that the cause of the increase in the in-cylinder temperature is attributed to the inappropriate acquisition of the reduction function of the in-cylinder temperature due to the insufficient amount of oil jet, and it is determined that the oil jet is in an abnormal state. Thus, it is possible to effectively utilize the existing ignition time control and accurately determine the presence or absence of the abnormality of the oil jet without using the means for detecting the hydraulic pressure and the like.

As one example, it may be configured to compare an actual ignition time with a required ignition time, which is delayed only by a KCS learning value that is learned in such a manner as to correct the knocking during occurrence of the knocking, with respect to a basic ignition time of the sparking plug, which is set based on an operational state of the internal combustion engine. Then, when a deviation of the actual ignition time to a delay angle side with respect to the required ignition time exceeds a predetermined amount, it may be configured to determine that the abnormal state where the oil jet amount runs short occurs.

As one example of the basic ignition time, the basic ignition time may be set as an ignition time on the delay angle side, out of an MBT ignition time, which is an ignition time at which maximum torque is acquired under present operational conditions of the internal combustion engine, and a knock ignition time, which is an advance angle limitation value of an ignition time at which a magnitude of the knocking can be kept within an allowable level.

Regarding the ideal combustion state of the internal combustion engine (a case where the cooling in the cylinders is favorably performed by the oil jet), the actual ignition time approximately corresponds to the required ignition time. However, when a state is brought where the oil jet is disabled, or where the amount of oil jet is not sufficiently obtained, the actual ignition time is transferred to the delay angle side with respect to the required ignition time in response to an increase in the in-cylinder temperature. Then, regarding the solution means of the present invention, when the transfer amount (deviation of the actual ignition time on the delay angle side to the required ignition time) to the delay angle side exceeds a predetermined amount, it is determined that the abnormal state where the oil jet amount runs short occurs. Accordingly, it accurately determines the presence or absence of the abnormality of the oil jet.

Also, as one example, an oil jet switching valve is provided on an oil path for performing the oil jet, the oil jet switching valve, when the operational state of the internal combustion engine is in an oil jet execution area, configured to be opened in response to an open instruction signal, and when the operational state of the internal combustion engine is in an oil jet stop area, configured to be closed in response to a closed instruction signal. Then, notwithstanding that the open instruction signal is outputted, when the delay angle amount of the ignition time of the sparking plug exceeds the predetermined determination threshold value, it may be configured to determine that the abnormal state where the oil jet amount runs short occurs.

In this manner, regarding one wherein the oil jet switching valve is provided, it is possible to switch the execution and non-execution of the oil jet as needed. For example, the oil jet switching valve is closed at the initial time of the start-up of the cooling the internal combustion engine, and the oil jet is stopped, so that the improvement of the warm-up performance of the internal combustion engine can be achieved, and the atomization of fuel injected in the cylinders is facilitated, thereby achieving the improvement of exhaust emission. Also, the oil jet switching valve is opened after the completion of the warm-up of the internal combustion engine, and the oil jet is executed, and the excessive increase in the in-cylinder temperature is suppressed, so that the occurrence of the knocking can be prevented. However, the above-mentioned oil jet switching valve is provided, there is a possibility that a failure occurs, such as the closed fixation of the oil jet switching valve. In this case, there is a possibility that the state is brought where the oil jet is disabled, or the amount of oil jet is not sufficiently obtained. Regarding the solution means of the present embodiment, it is possible to effectively utilize the existing ignition time control and accurately determine the presence or absence of the abnormality of the oil jet, as measures involved with the increase in the number of sections where a failure is likely to occur. Accordingly, a disadvantage in that the oil jet switching valve is provided can be solved, and practicality in that the oil jet switching valve is provided can be enhanced.

Also, as one example, when oil jet abnormality determination is made with respect to one in which a variable valve timing mechanism is provided in the internal combustion engine, it may be configured to acquire oil type and oil viscosity from a response time of the variable valve timing mechanism and determine a fixation state of the oil jet switching valve based on the oil type, the oil viscosity, and the hydraulic pressure detected.

Accordingly, not only it can be determined whether or not the abnormal state where the oil jet amount runs short occurs, but also the fixation state of oil jet switching valve can be determined, which makes it possible to take measures for solving the failure at an early time.

As the control of the internal combustion engine, which is carried out in accordance with the results of the abnormality determination on the oil jet, when it is determined that the abnormal state where the oil jet amount runs short occurs, it is configured to limit output of the internal combustion engine.

Accordingly, further increase in the in-cylinder temperature can be suppressed, and a life of constituent components of the internal combustion engine can be prolonged.

Advantageous Effects of Invention

According to the present invention, when the delay angle amount of the ignition time of the sparking plug exceeds the predetermined determination threshold value, it is configured to determine that the abnormal state where the oil jet amount runs short occurs. Accordingly, it is possible to effectively utilize the existing ignition time control and accurately determine the presence or absence of the abnormality of the oil jet.

DESCRIPTION OF EMBODIMENTS

Figure 1:
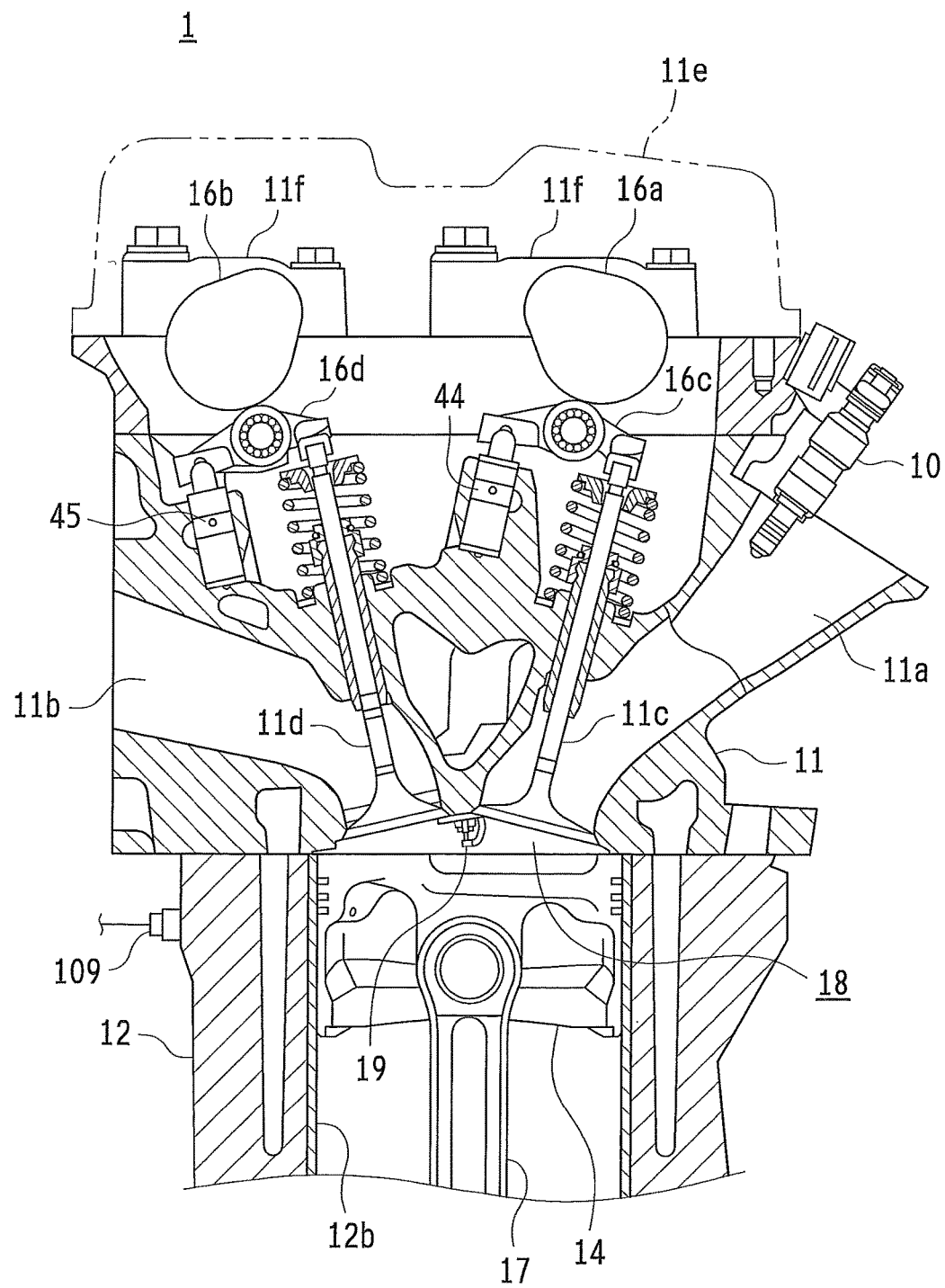
FIG. 1 is a cross-sectional view illustrating the constitution of an engine according to the present embodiment.

Hereinafter, embodiments of the present invention will be described referring to the drawings. In the present embodiment, description will be given with regard to a case where the present invention is applied to a multi-cylinder (for example, inline four-cylinder) gasoline engine for an automobile.

—Schematic Constitution of Engine—

FIG. 1 is a cross-sectional view illustrating the constitution of an engine (internal combustion engine) 1 according to the present embodiment. As illustrated in FIG. 1, the engine 1 according to the present embodiment includes a cylinder block 12 that includes cylinder bores 12b of four cylinders (the cylinder bore of only one cylinder is illustrated in FIG. 1) and a cylinder head 11. A piston 14 provided in a reciprocating manner is provided in each cylinder bore 12b. The piston 14 is connected to a crankshaft (not illustrated in FIG. 1), which is the output shaft of the engine 1, via a con-rod (connecting rod) 17. Then, a combustion chamber 18 is partitioned and formed by a space surrounded by the piston 14 and the cylinder head 11 in the interior of the cylinder bore 12b.

An ignition plug (sparking plug) 19 with respect to each combustion chamber 18 is mounted in the cylinder head 11. The ignition plug 19 ignites air-fuel mixture supplied to the combustion chamber 18.

Also, an intake port 11a and an exhaust port 11b, each of which is connected to the combustion chamber 18, are individually provided in the cylinder head 11. An intake valve 11c and an exhaust valve 11d are respectively provided at each opening end communicated with the combustion chamber 18, in the intake port 11a and the exhaust port 11b. The intake valve 11c and the exhaust valve 11d are opened and closed by an intake camshaft 16a and an exhaust camshaft 16b via rocker arms 16c and 16d. The intake camshaft 16a and the exhaust camshaft 16b are rotated by motive power of the crankshaft.

An injector (fuel injection valve) 10 that injects fuel into the intake port 11a is provided in the cylinder head 11. That is, the engine 1 according to the present embodiment injects the fuel from an injector 10 in the air drawn in toward the cylinder bore 12b via the intake port 11a and generates the air-fuel mixture. Then, the air-fuel mixture is compressed by the pistons 14 and ignited by an ignition plug 19, thereby carrying out combustion.

It is noted that a reference number 11e in FIG. 1 represents a cylinder head cover (illustrated by a virtual line). Reference numbers 11f represent cam caps that rotatably support the upper side portions of the journal portions of the respective camshafts 16a and 16b. Reference numbers 44 and 45 are lash adjusters that support the rocker arms 16c and 16d.

—Oil Supply System of Engine—

Next, the schematic constitution of an oil supply system of the engine 1 according to the present embodiment will be described.

Figure 2:
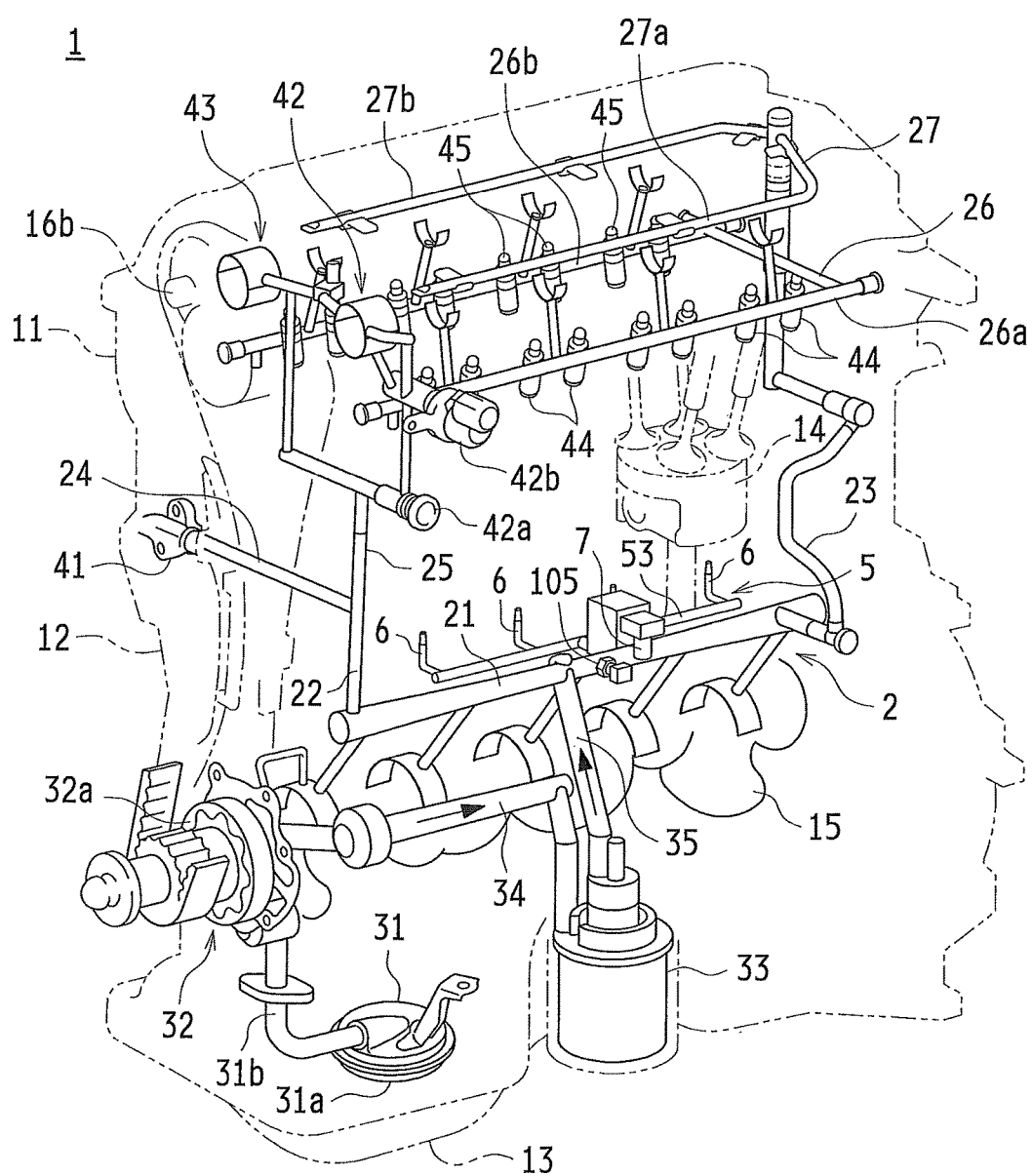
FIG. 2 is a schematic perspective view illustrating the outline of an oil supply system of the engine.

FIG. 2 is a view illustrating the schematic constitution of an oil supply system 2. As illustrated in FIG. 2, in the oil supply system 2, the oil accumulated in an oil pan 13 is sucked out from the oil pan 13. The oil is supplied to a plurality of members to be lubricated and a plurality of members to be cooled such as the pistons 14, crankshafts 15, and camshafts 16a and 16b. Then, the oil flows back from the members to be lubricated or the members to be cooled into the oil pan 13.

An oil strainer 31 that includes an inlet port 31a for sucking the oil accumulated in the interior of the oil pan 13 is arranged in the vicinity of the bottom portion of the oil pan 13. The oil strainer 31 is connected to an oil pump 32 provided in the cylinder block 12 via a strainer flow path 31b.

The oil pump 32 is a known rotary pump. The rotor 32a of the oil pump 32 is mechanically jointed with the crankshaft 15 in such a manner as to rotate with the crankshaft 15. The oil pump 32 is connected to the oil inlet of an oil filter 33 provided on the outside of the cylinder block 12 via an oil transport path 34. Also, the oil outlet of the oil filter 33 is connected to an oil supply path 35 provided as an oil path oriented to the members to be lubricated or the members to be cooled. It is noted that an electric oil pump may be applied as the oil pump 32.

The specific constitution of the oil supply system 2 in which the oil is supplied through the oil supply path 35 will be described below.

In the oil supply system 2, the oil is pumped up from the oil pan 13 via the oil strainer 31. Then, the oil is supplied to each member to be lubricated by means of the oil pump 32 and used as lubricating oil. Also, the oil is supplied to each member to be cooled such as the piston 14 and used as cooling oil. Also, the oil is supplied to a hydraulic-actuated instrument and used as hydraulic oil.

Specifically, after passing through the oil filter 33, the oil, which is pressure-fed from the oil pump 32, is forwarded to a main oil hall (main gallery; main oil path) 21 extended along the direction of cylinder arrangement. Oil paths 22 and 23 that extend upward from the cylinder block 12 to the cylinder head 11 are communicated with one end side and the other end side of the main oil hall 21.

The oil path 22, which is communicated with the one end side (left side in FIG. 2) of the main oil hall 21, further diverges into a chain tensioner side path 24 and a VVT (Variable Valve Timing) side path 25.

The oil supplied to the chain tensioner side path 24 is utilized as the hydraulic oil for a chain tensioner 41 to adjust the tension of a timing chain. In contrast, the oil supplied to the VVT side path 25 is utilized as the hydraulic oil for an OCV 42b for VVT and a variable valve timing mechanisms 42 and 43 through the oil filter 42a for an OCV (Oil Control Valve).

On the other hand, the oil path 23, which is communicated with the other end side (right side in FIG. 2) of the main oil hall 21, further diverges into a lash adjuster side path 26 and a shower pipe side path 27.

The lash adjuster side path 26 further diverges into an intake side path 26a and an exhaust side path 26b. The oil passing through the respective paths 26a and 26b is used as the hydraulic oil for the lash adjusters 44 and 45.

It is noted that the lash adjuster side path 26 diverges and supplies the oil to the journal portions of respective camshafts 16a and 16b. The oil lubricates gaps between the camshafts 16a and 16b and the journal bearing portion of the cylinder head 11 and between the camshafts 16a and 16b and the journal bearing portions of the cam caps 11f.

The shower pipe side path 27 also diverges into an intake side path 27a and an exhaust side path 27b. The oil flowing the respective paths 27a and 27b is dispersed from the oil dispersion hole, not illustrated, to the cam lobes of the respective camshafts 16a and 16b, which is conductive to the lubrication therebetween.

—Oil Jet Apparatus—

The oil supply system 2 includes an oil jet apparatus 5 that cools the pistons 14. Hereinafter, the oil jet apparatus 5 will be described.

Figure 3:
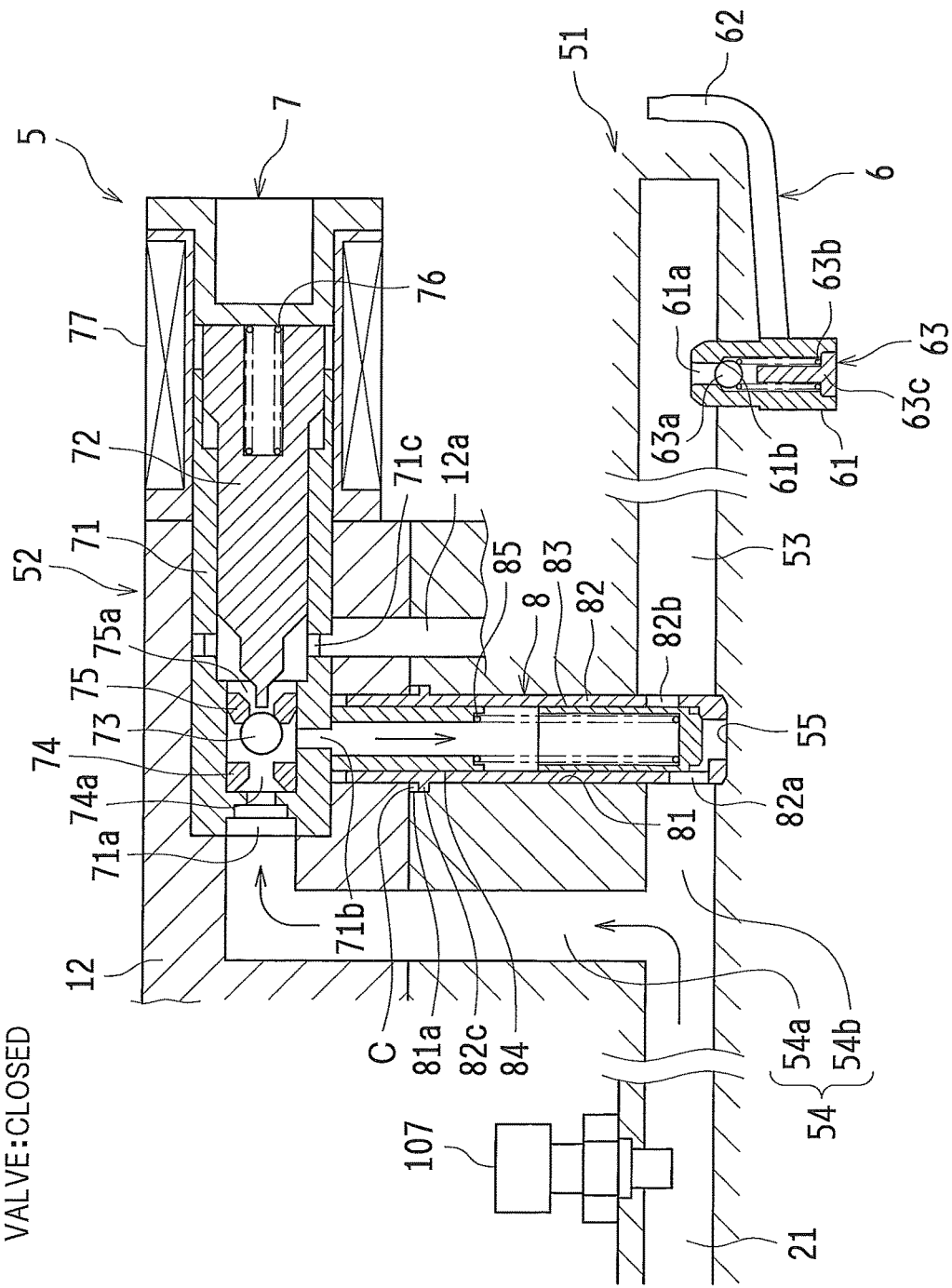
FIG. 3 is a cross-sectional view of an oil jet apparatus and its periphery and the view illustrating the closed state of an oil jet switching valve and a check ball mechanism.

FIG. 3 is a cross-sectional view of the oil jet apparatus 5 and its periphery. FIG. 3 illustrates a state where a later-described oil jet switching valve 8 is closed (see FIG. 4 regarding a state where the oil jet switching valve 8 is opened). It is noted that, for convenience' sake, in FIGS. 3 and 4, a later-described OSV 7 is arranged in the horizontal direction (its axial direction corresponds to the horizontal direction), and a hydraulic pressure sensor 107 is arranged in the vertical direction (its axial direction corresponds to the vertical direction).

As illustrated in FIG. 3, the oil jet apparatus 5 includes an oil jet mechanism 51 and an oil jet switching mechanism 52 provided on the upstream side of the oil jet mechanism 51.

The oil jet mechanism 51 includes a plurality (four in the present embodiment) of piston jet nozzles (oil jet nozzles) 6 disposed in accordance with respective cylinders. Also, the oil jet mechanism 51 includes an oil jet gallery (oil path) 53. The oil jet gallery 53 supplies the oil flown in from the main oil hall 21 to the piston jet nozzles 6 in a case where the oil jet switching valve 8 of the oil jet switching mechanism 52 is in an open state.

On the other hand, the oil jet switching mechanism 52 includes an oil jet flow path 54 communicated with the main oil hall 21. Also, the oil jet switching mechanism 52 includes an OSV (Oil Switching Valve; control valve) 7, which is connected to the oil jet flow path 54, and the oil jet switching valve 8.

Hereinafter, the specific constitution of the oil jet mechanism 51 and the oil jet switching mechanism 52 will be described.

(Oil Jet Mechanism)

The oil jet gallery 53 is formed in the interior of the cylinder block 12, and the upstream end of the oil jet gallery 53 can be communicated with the main oil hall 21 via the oil jet switching mechanism 52. Also, the downstream side of the oil jet gallery 53 diverges in accordance with each cylinder. The piston jet nozzle 6 is disposed in the vicinity of each downstream end of the diverged oil path. Accordingly, in a case where the oil jet switching valve 8 of the oil jet switching mechanism 52 is in an open state (see FIG. 4), the oil is supplied from the main oil hall 21 through the oil jet switching mechanism 52 to the oil jet gallery 53 (the opening/closing operation of the oil jet switching valve 8 in the oil jet switching mechanism 52 will be described later).

The piston jet nozzle 6 includes a main body 61 and a tubular nozzle 62 mounted on the main body 61.

A check ball mechanism (check valve mechanism) 63 is stored in the interior of the main body 61. As the specific constitution of a check ball mechanism 63, a through hole 61a that is penetrated in the up-and-down direction is formed in the interior of the main body 61. The upper end opening of the through hole 61a is communicated with the oil jet gallery 53. Also, regarding the dimension of the internal diameter of the through hole 61a, the upper side portion thereof is formed in a small diameter (hereinafter, referred to as a small-diameter portion), and the lower side portion thereof is formed in a large diameter (hereinafter, referred to as a large-diameter portion). Then, the lower end of the small-diameter portion is provided as a valve seat 61b.

A check ball 63a that can be in contact with the valve seat 61b is stored in the interior of the through hole 61a. Also, a spring 63b made up of a compression coil spring that presses the check ball 63a against the valve seat 61b is stored in the interior of the through hole 61a. The dimension of the external diameter of the check ball 63a is set larger than the dimension of the internal diameter of the small-diameter portion of the through hole 61a and smaller than the dimension of the internal diameter of the large-diameter portion of the through hole 61a. Furthermore, a plug 63c that blocks the lower end opening of the through hole 61a and is in contact with the lower end of the spring 63b is installed at the lower end of the main body 61. Accordingly, the spring 63b is compressed between the check ball 63a and the plug 63c.

On the other hand, the internal space of the nozzle 62 is communicated with the large-diameter portion of the through hole 61a of the main body 61. Also, after extending from the main body 61 approximately in the horizontal direction, the nozzle 62 extends upward approximately in the vertical direction, and an injection hole oriented to the rear surface of the piston 14 is formed on the upper end portion of the nozzle 62.

With this constitution, when hydraulic pressure acted on from the oil jet gallery 53 to the upper end opening of the through hole 61a is less than predetermined pressure, the check ball 63a is in contact with the valve seat 61b by means of the energized force of the spring 63b. Accordingly, the through hole 61a is closed (closed state of the check ball mechanism 63; see FIG. 3). In this case, the oil jet from the injection hole of the nozzle 62 is not executed.

On the other hand, when the hydraulic pressure acted on from the oil jet gallery 53 to the upper end opening of the through hole 61a is equal to or higher than the predetermined pressure, the check ball 63a is separated from the valve seat 61b against the energized force of the spring 63b. Accordingly, the through hole 61a is opened (open state of the check ball mechanism 63; see FIG. 4). Then, the oil, which is flown from the oil jet gallery 53 into the through hole 61a, flows into the nozzle 62. Accordingly, the oil flown in the nozzle 62 is injected to the rear surface of the piston 14. The piston 14 is cooled by the oil jet. For example, this suppresses the excessive increase in an in-cylinder temperature, thereby preventing the occurrence of knocking. It is noted that the value of hydraulic pressure, at which the check ball mechanism 63 is opened, is adjusted by appropriately setting the spring constant of the spring 63b.

(Oil Jet Switching Mechanism)

The oil jet flow path 54 of the oil jet switching mechanism 52 is formed in the interior of the cylinder block 12, and the upstream end of the oil jet flow path 54 is communicated with the main oil hall 21. Also, the oil jet flow path 54, near the downstream end thereof, diverges into a pilot flow path 54a which at the downstream end thereof is connected with the OSV 7 and an oil jet guiding oil path 54b disposed on the approximately same axis as that of the oil jet gallery 53.

The oil jet switching valve 8 is stored in a valve insertion hole 81 formed in the interior of the cylinder block 12. The valve insertion hole 81 extends in the direction approximately orthogonal to the extending direction of the oil jet gallery 53 and the oil jet guiding oil path 54b. Also, one end side (upper end side in the diagram) of the valve insertion hole 81 is communicated with the internal space of the OSV 7, and the other end side (lower end side in the diagram) of the valve insertion hole 81 is communicated with the oil jet gallery 53 and the oil jet guiding oil path 54b.

Figure 5:
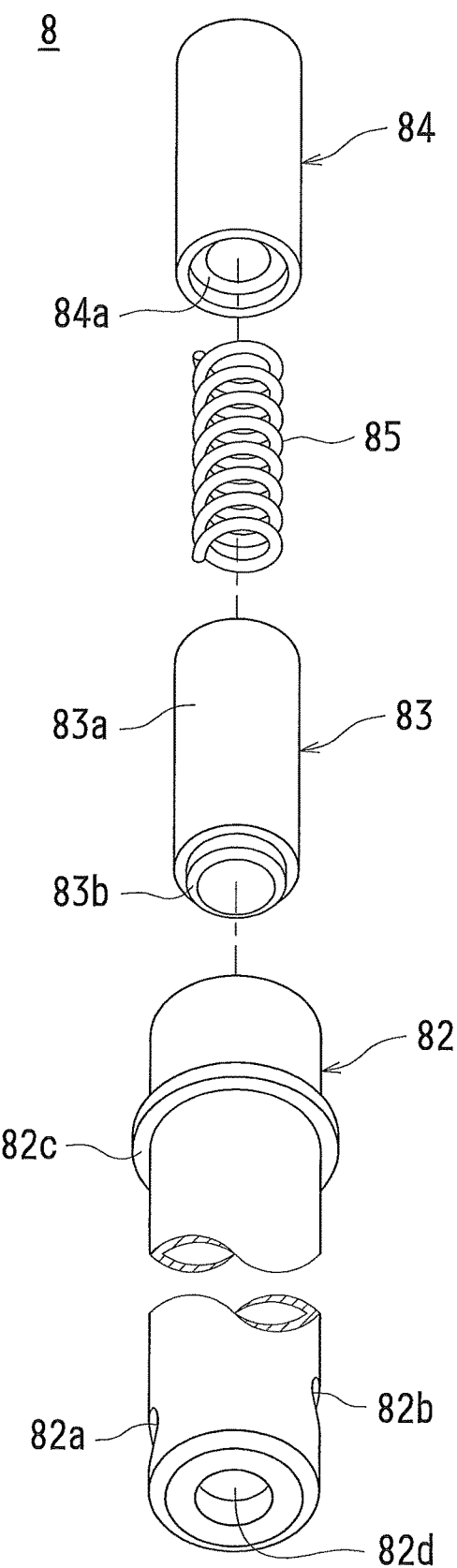
FIG. 5 is an exploded perspective view illustrating the oil jet switching valve.

As illustrated in FIG. 5 (the exploded perspective view of the oil jet switching valve 8), the oil jet switching valve 8 stored in the valve insertion hole 81 includes a valve housing 82, a main valve body 83, a collar 84, and a spring 85. Hereinafter, respective portions will be described.

<Valve Housing>

The valve housing 82 is a member that has an approximately cylindrical shape and is inserted into the valve insertion hole 81. The dimension of the external diameter of the valve housing 82 approximately corresponds to the dimension of the internal diameter of the valve insertion hole 81. Accordingly, the valve housing 82 is freely movable in the direction (up-and-down direction in FIG. 3) along the axis thereof in the interior of the valve insertion hole 81. Also, the length dimension of the valve housing 82 (the length dimension in the direction along the shaft center) is set slightly shorter than the sum of the length dimension of the valve insertion hole 81 (the length dimension in the direction along the shaft center) and the dimension of the internal diameter of the oil jet guiding oil path 54b. Accordingly, the valve housing 82 can slightly reciprocate along the shaft center thereof in the interior of the valve insertion hole 81.

Also, an oil guiding inlet 82a and an oil guiding outlet 82b, between which the shaft center of the valve housing 82 is sandwiched, are formed opposite to each other on the lateral side in the vicinity of tip end portion of the valve housing 82. The oil guiding inlet 82a is opened to the oil jet guiding oil path 54b. The shaft center of the oil guiding inlet 82a is orthogonal to the shaft center of the valve housing 82. In contrast, the oil guiding outlet 82b is opened to the oil jet gallery 53. The shaft center of the oil guiding outlet 82b is also orthogonal to the shaft center of the valve housing 82. Also, the opening area of the oil guiding outlet 82b is set slightly smaller than the opening area of the oil guiding inlet 82a. Also, the shaft center of the oil guiding outlet 82b is positioned slightly on the upper side with respect to the shaft center of the oil guiding inlet 82a (see FIG. 8).

Also, an annular concave portion 81a is formed at a position in the vicinity of the upper end in the diagram on the inner surface of the valve insertion hole 81. The formation position, height dimension, and external-diameter dimension of the concave portion 81a are appropriately set.

On the other hand, an annular protrusion 82c inserted into the concave portion 81a is formed on the outer circumferential surface of the valve housing 82. The thickness dimension of the protrusion 82c (dimension in the up-and-down direction in FIG. 3) is slightly shorter than the height dimension of the concave portion 81a (dimension in the up-and-down direction in the diagram). That is, a clearance C is provided between the protrusion 82c and the concave portion 81a in the up-and-down direction of the diagram. Accordingly, the valve housing 82 is freely movable only by the dimension of the clearance C in the direction along the shaft center (the up-and-down direction of the diagram) in the interior of the valve insertion hole 81.

Also, a recessed portion 55 whose shape approximately matches the shape of the tip end portion (lower end portion) of the valve housing 82 is formed on the bottom portion of the oil path in the boundary portion between the oil jet guiding oil path 54b and the oil jet gallery 53. The recessed portion 55 is formed in an approximately cylindrical shape, and the dimension of the internal diameter of the recessed portion 55 is set in such a manner as to approximately correspond to the dimension of the external diameter of the tip end portion of the valve housing 82 or be slightly larger than the dimension of the external diameter of the tip end portion of the valve housing 82. Accordingly, when the valve housing 82, which is freely movable in the up-and-down direction as described above, is transferred to the lower side, the tip end portion of the valve housing 82 is configured to fit into the recessed portion 55. Also, in a state where the tip end portion of the valve housing 82 fits into the recessed portion 55, it is configured that the lower surface of the protrusion 82c of the valve housing 82 is in contact with the bottom surface of the concave portion 81a of the valve insertion hole 81, or that a slight gap exists therebetween. That is, when the valve housing 82 is transferred to the lower side, the protrusion 82c and the concave portion 81a are formed in such a manner as to include the clearance C that allows the valve housing 82 to transfer to a position at which the tip end portion of the valve housing 82 fits into the recessed portion 55.

Figure 8:
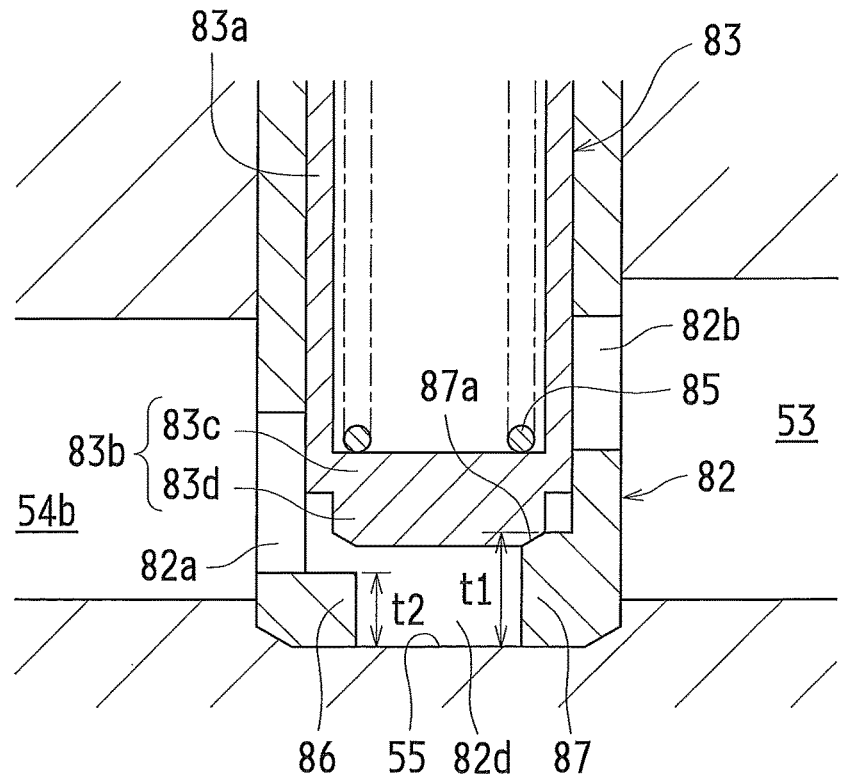
FIG. 8 is an enlarged cross-sectional view of a tip end portion of the oil jet switching valve and the view illustrating the closed state of the oil jet switching valve.

Furthermore, as illustrated in FIG. 8, an opening 82d is formed at the tip end portion of the valve housing 82. Protrusions 86 and 87 that protrude to the inner circumferential side are provided on the inner circumferential edge of the opening 82d. The height dimension (t1 in the diagram) of the protrusion 87 provided on the side of the oil guiding outlet 82b is set slightly longer than the height dimension (t2 in the diagram) of the protrusion 86 provided on the side of the oil guiding inlet 82*a*. Also, an inclined surface 87*a* is formed on the upper end portion of the inner edge of the protrusion 87 provided on the side of the oil guiding outlet 82*b*. In a later-described closed state of the main valve body 83, the tip end portion of the main valve body 83 is in contact with the inclined surface 87*a*. It is noted that the formation of the protrusion 87 on the side of the oil guiding outlet 82*b* is set in a range of approximately one third to one fourth of the entire circumference of the valve housing 82. The range is not limited to this, but as described later, the range may be applied wherein an area (the area of the inclined surface 87*a*), on which the energized force of the spring 85 is steadily transmitted to the valve housing 82 via the main valve body 83, is secured.

<Main Valve Body>

The main valve body 83 is inserted into the interior of the valve housing 82. As illustrated in FIGS. 5 and 8, the main valve body 83 is formed in a bottomed cylindrical shape and includes a cylindrical torso portion 83*a* and a valve portion 83*b* integrally formed with the lower end of the torso portion 83*a*. The dimension of the external diameter of the torso portion 83*a* approximately corresponds to the dimension of the internal diameter of the valve housing 82. Accordingly, the main valve body 83 is freely movable in the interior of the valve housing 82 in the direction along the shaft center thereof (the up-and-down direction of the diagram). Also, as the constitution of the valve portion 83*b*, the valve portion 83*b* includes a base portion 83*c*, whose dimension of the external diameter corresponds to the dimension of the external diameter of the torso portion 83*a*, and a tip end portion 83*d* that is contiguously disposed on the lower end of the base portion 83*c*, and that has a diameter smaller than that of the base portion 83*c*. The dimension of the external diameter of the tip end portion 83*d* is larger than the dimension of the internal diameter of the opening 82*d* formed in the tip end portion of the valve housing 82. Accordingly, as described above, in the closed state of the main valve body 83, it is constituted that the tip end portion 83*d* of the valve portion 83*b* is in contact with the inclined surface 87*a* of the protrusion 87 provided on the side of the oil guiding outlet 82*b* of the valve housing 82 (see the state illustrated in FIG. 8). Also, in a state where the tip end portion 83*d* of the valve portion 83*b* is in contact with the inclined surface 87*a* of the protrusion 87 on the side of the oil guiding outlet 82*b*, a gap is made between the tip end portion 83*d* of the valve portion 83*b* and the protrusion 86 on the side of the oil guiding inlet 82*a*, and it is constituted that the hydraulic pressure of the main oil hall 21 and the oil jet guiding oil path 54*b* acts on the tip end portion 83*d* of the valve portion 83*b*. This hydraulic pressure acts in the vertical direction with respect to the tip end portion 83*d* of the valve portion 83*b*, which functions as a force with which the main valve body 83 is transferred backward (transferred upward in the diagram).

<Collar>

The collar 84 is a cylindrical member inserted into the interior of the valve housing 82. The dimension of the external diameter of the collar 84 approximately corresponds to the dimension of the internal diameter of the valve housing 82. Also, a spring seat 84*a* that is in contact with the upper end edge of the spring 85 is formed in the lower end portion of the collar 84. The upper end surface of the collar 84 is in contact with the casing 71 of the OSV 7 described later.

<Spring>

The spring 85 is made up of a compression coil spring. The spring 85 is stored in a compressed state between the upper surface of the valve portion 83*b* of the main valve body 83 and the spring seat 84*a* of the collar 84. Accordingly, an energized force oriented downward in the diagram is applied to the main valve body 83. That is, the energized force, which is oriented in such a manner as to cause the main valve body 83 to move forward to the boundary portion between the oil jet guiding oil path 54*b* and the oil jet gallery 53, is applied. Accordingly, when the back pressure of the main valve body 83 and the internal pressure (hydraulic pressure acted on the tip end portion 83*d* of the valve portion 83*b*) of the oil jet guiding oil path 54*b* approximately become equal, the main valve body 83 is transferred forward by the energized force of the spring 85 to the side of the oil jet guiding oil path 54*b*, thereby closing the oil guiding outlet 82*b* of the valve housing 82. Consequently, this cuts off space between the oil jet guiding oil path 54*b* and the oil jet gallery 53 (the closed state of the oil jet switching valve 8; see a state of FIG. 3). In contrast, when the internal pressure (the hydraulic pressure acted on the tip end portion 83*d* of the valve portion 83*b*) of the oil jet guiding oil path 54*b* becomes higher than the sum of the back pressure of the main valve body 83 and the energized force of the spring 85, the main valve body 83 transfers against the energized force of the spring 85 in the direction that the main valve body 83 moves backward from the oil jet guiding oil path 54*b* (is drawn in the interior of the valve insertion hole 81), thereby opening the oil guiding outlet 82*b* of the valve housing 82. Accordingly, the oil jet guiding oil path 54*b* and the oil jet gallery 53 are communicated to each other therebetween (the opened state of the oil jet switching valve 8; see a state of FIG. 4).

<OSV>

Regarding the OSV 7, a plunger 72 is stored in the casing 71 in such a manner as to be capable of reciprocating, and the flow paths of the oil are switched by the reciprocating movement of the plunger 72 in response to the electric conduction and non-electric conduction of an electromagnetic solenoid 77.

Specifically, a hydraulic pressure guiding port 71*a*, a valve pressure port 71*b*, and a drain port 71*c* are formed in the casing 71. The hydraulic pressure guiding port 71*a* is provided on the tip end surface of the casing 71 and communicated with the pilot flow path 54*a*. The valve pressure port 71*b* is provided on the lateral surface (the lower surface in FIG. 3) of the casing 71 and communicated with the valve insertion hole 81. The drain port 71*c* is provided on the lateral surface of the casing 71 on the base end side (the side of the electromagnetic solenoid 77) with respect to the formation position of valve pressure port 71*b* and communicated with a drain oil path 12*a* connected to a crankcase not illustrated.

Also, check ball 73 is stored in positions in accordance with the hydraulic pressure guiding port 71*a* and the valve pressure port 71*b* in the casing 71. Depending on its position, the check ball 73 is movably transferred between a valve closed position (see the state in FIG. 3) where the hydraulic pressure guiding port 71*a* and the valve pressure port 71*b* are communicated, and the hydraulic pressure guiding port 71*a* and the valve pressure port 71*b* are isolated from the drain port 71*c*, and a valve opened position (see the state in FIG. 4) where the valve pressure port 71*b* and the drain port 71*c* are communicated, and the valve pressure port 71*b* and the drain port 71*c* are isolated from the hydraulic pressure guiding port 71*a*.

Figure 4:
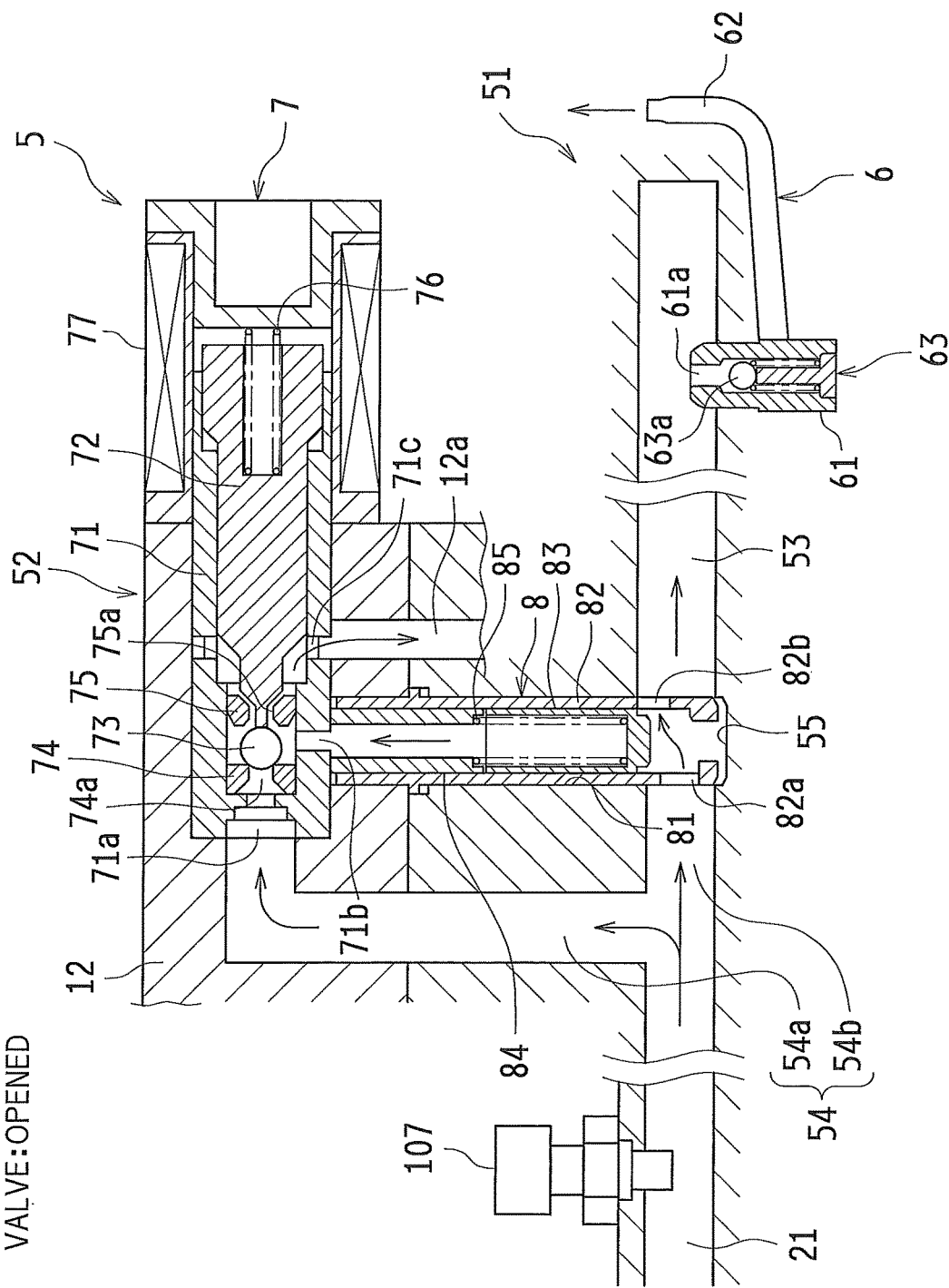
FIG. 4 is a cross-sectional view of the oil jet apparatus and its periphery and the view illustrating the opened state of the oil jet switching valve and the check ball mechanism.

Specifically, a stopper 74 is fixed on the side of the hydraulic pressure guiding port 71a with respect to the position of the check ball 73 stored. The stopper 74 includes a hydraulic pressure guiding hole 74a with which the hydraulic pressure guiding port 71a and the interior (the storage space of the check ball 73) of the casing 71 are communicated. The dimension of the internal diameter of the hydraulic pressure guiding hole 74a is set smaller than the dimension of the external diameter of the check ball 73. Accordingly, when the check ball 73 is at a position where the check ball 73 moves backward from the stopper 74, as illustrated in FIG. 3, the hydraulic pressure guiding hole 74a is opened, and the hydraulic pressure guiding port 71a and the valve pressure port 71b are communicated. In contrast, when the check ball 73 is transferred to the stopper 74 and is in contact with the stopper 74, as illustrated in FIG. 4, the hydraulic pressure guiding hole 74a is closed, and the hydraulic pressure guiding port 71a and the valve pressure port 71b are isolated.

Also, a valve sheet 75 is fixed on the side of the drain port 71c with respect to the storage position of the check ball 73. The valve sheet 75 includes a drain hole 75a with which the drain port 71c and the interior (the storage space of the check ball 73) of the casing 71 are communicated. The dimension of the internal diameter of the drain hole 75a is set smaller than the dimension of the external diameter of the check ball 73. Accordingly, when the check ball 73 is at a position where the check ball 73 moves backward from the valve sheet 75, as illustrated in FIG. 4, the drain hole 75a is opened, and the valve pressure port 71b and the drain port 71c are communicated. In contrast, when the check ball 73 is transferred to the valve sheet 75 and is in contact with the valve sheet 75, as illustrated in FIG. 3, the drain hole 75a is closed, and the valve pressure port 71b and the drain port 71c are isolated.

Also, an energized force oriented to the side of the check ball 73 is applied to the plunger 72 by means of the spring 76 made up of the compression coil spring. Also, the plunger 72 is driven by the electromagnetic solenoid 77. That is, when a voltage is not applied to the electromagnetic solenoid 77, as illustrated in FIG. 4, the plunger 72 is transferred forward by the energized force of the spring 76 to the left side of the diagram in the casing 71. This state represents the OFF state of the OSV 7. In contrast, when a voltage is applied to the electromagnetic solenoid 77, as illustrated in FIG. 3, the plunger 72 is transferred backward against the energized force of the spring 76 to the right side of the diagram in the casing 71. This state represents the ON state of the OSV 7. The application and non-application of the voltage to the electromagnetic solenoid 77 is controlled by an ECU 100 (see FIG. 6).

In the ON state of the OSV 7, as illustrated in FIG. 3, the plunger 72 does not press the check ball 73, and the check ball 73 receives the hydraulic pressure from the pilot flow path 54a, which causes the check ball 73 to move backward from the stopper 74 and stay at a position in such a manner as to be in contact with the valve sheet 75. Accordingly, the hydraulic pressure guiding port 71a and the valve pressure port 71b are communicated. Consequently, the hydraulic pressure passing from the main oil hall 21 through the pilot flow path 54a is guided to the valve insertion hole 81. In this case, the hydraulic pressure from the main oil hall 21 acts on the tip end surface and the back surface of the main valve body 83 of the oil jet switching valve 8, so that the main valve body 83 is transferred to the side of the oil jet guiding oil path 54b by the energized force of the spring 85 provided on the back surface side thereof (transferred to the lower side in the diagram). Following the transfer of the main valve body 83, the main valve body 83 closes the oil guiding outlet 82b of the valve housing 82, and the outer edge portion of the tip end portion 83d of the main valve body 83 is in contact with the inclined surface 87a of the protrusion 87 on the side of the oil guiding outlet 82b of the valve housing 82. With this contact, the valve housing 82 also receives the energized force of the spring 85, and the valve housing 82 transfers forward to the recessed portion 55, and as illustrated in FIG. 8, the tip end portion of the valve housing 82 fits into the recessed portion 55. Accordingly, the downstream end of the oil jet guiding oil path 54b is in a state of being closed by the oil jet switching valve 8, and the oil is not supplied to the oil jet gallery 53 of the oil jet mechanism 51, and the oil jet is stopped.

On the other hand, when the OSV 7 is in the OFF state, as illustrated in FIG. 4, the plunger 72 receives the energized force of the spring 76, transfers forward, and presses the check ball 73. Accordingly, the check ball 73 moves backward from the valve sheet 75 and stays at a position where the check ball 73 is in contact with stopper 74, and the valve pressure port 71b and the drain port 71c are communicated. Consequently, the oil in the valve insertion hole 81 is drained from the valve pressure port 71b and the drain port 71c through the drain oil path 12a into the crankcase. This causes the hydraulic pressure in the valve insertion hole 81 to descend rapidly. Also, the hydraulic pressure from the main oil hall 21 acts on the tip end surface of the main valve body 83 of the oil jet switching valve 8, so that the oil jet switching valve 8 is transferred to the interior of the valve insertion hole 81 against the energized force of the spring 85 provided on the back surface side thereof (transferred to the upper side in the diagram). Following the transfer of the main valve body 83, the main valve body 83 opens the oil guiding outlet 82b of the valve housing 82, and the oil jet guiding oil path 54b and the oil jet gallery 53 are communicated, and the oil is supplied to the oil jet gallery 53 of the oil jet mechanism 51. Then, when the hydraulic pressure of the oil supplied to the oil jet gallery 53 reaches a predetermined value in response to the increase in the engine rotation speed, the check ball mechanism 63 of the piston jet nozzle 6 is opened, and the oil jet is executed, and the piston 14 is cooled.

Thus, in the oil jet switching mechanism 52, the hydraulic pressure in the interior of the valve insertion hole 81 is switched in conjunction with the switching operation of the OSV 7, and the opening/closing of the oil jet switching valve 8 is carried out. Accordingly, the OSV 7 only needs to include a switching function of the oil supply paths, which makes it possible to provide a relatively small-size OSV 7. Consequently, this achieves the miniaturization of the oil jet switching mechanism 52. Also, when the oil jet switching valve 8 is transferred backward, the hydraulic pressure of the valve insertion hole 81 is descended. Accordingly, the backward transfer of the oil jet switching valve 8 is started approximately concurrently with the switching of the OSV 7, which is favorable in terms of controllability.

The cooling of the pistons 14 is mainly aimed at preventing the occurrence of knocking in the combustion stroke of the engine 1. Accordingly, basically, a demand for cooling the pistons 14 is low during the warm-up of the engine 1, while the demand for cooling the pistons 14 becomes high after the completion of the warm-up of the engine 1 (in particular, in a high-load operation area or a high rotation area after the completion of the warm-up). Accordingly, for example, at the initial time of the start-up of the cooling the engine 1, the temperature of a coolant is relatively low, so that the demand for cooling the pistons 14 is low, and the OSV 7 is brought into the ON state, and the oil jet is stopped. Accordingly, the improvement of the warm-up performance of the engine 1 is achieved, and the atomization of fuel injected in the cylinder is facilitated, thereby achieving the improvement of exhaust emission or the prevention of oil dilution. On the other hand, in a predetermined operation area (the high-load operation area or the high rotation area) after the completion of the warm-up of the engine 1, the OSV 7 is brought into the OFF state, and the engine oil is supplied to the oil jet gallery 53, and the engine oil is injected from respective piston jet nozzles 6 to the back surface side of the pistons 14. This suppresses the excessive increase in an in-cylinder temperature, thereby preventing the occurrence of knocking.

—Control System—

Figure 6:
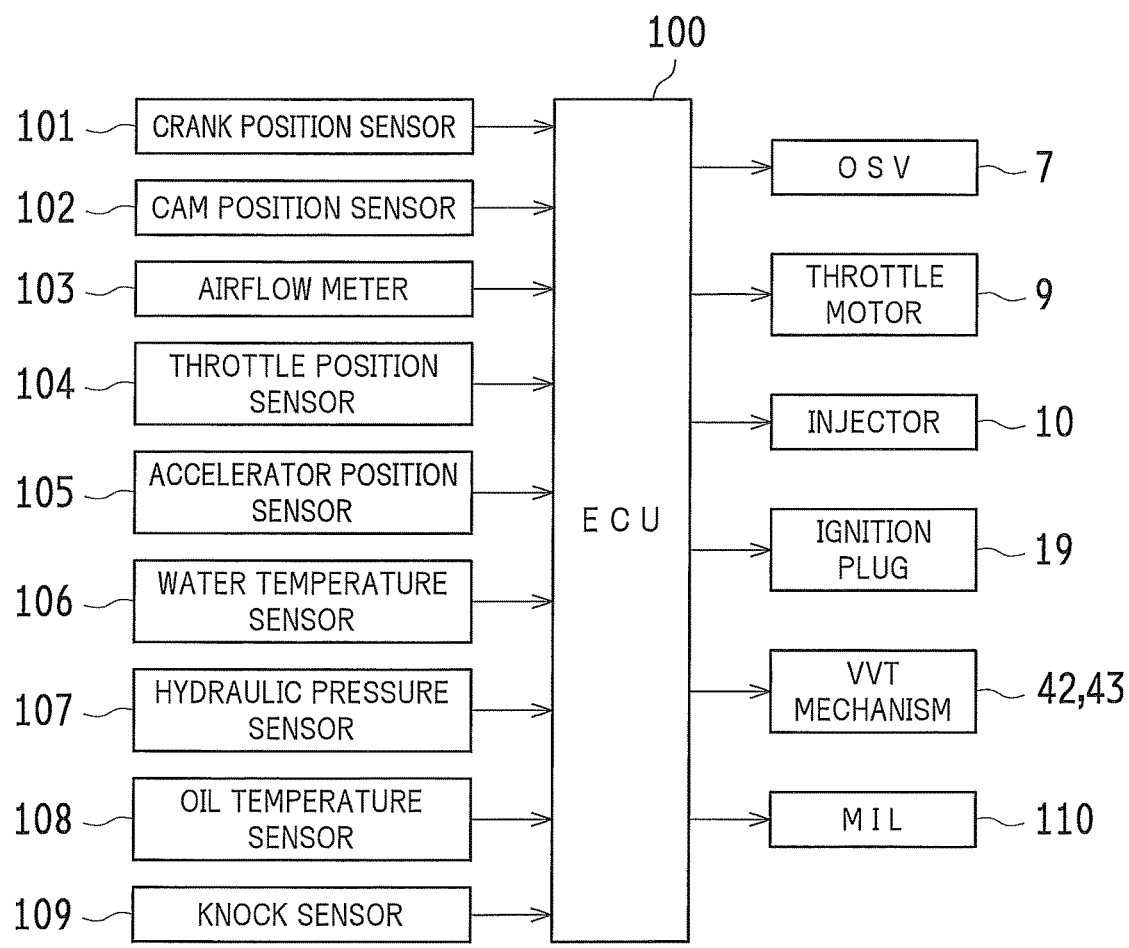
FIG. 6 is a block diagram illustrating the control system of the engine and the oil jet apparatus.

FIG. 6 is a block diagram illustrating a control system of the engine 1 and the oil jet apparatus 5. The ECU 100 is an electronic control unit that executes the driving control of the engine 1 and the like. The ECU 100 includes a CPU (Central Processing Unit), a ROM (Read Only Memory), a RAM (Random Access Memory), a backup RAM, and the like.

The ROM stores various control programs, maps that are referred to when executing those various control programs, and the like. The CPU executes various arithmetic processes based on the various control programs and maps stored in the ROM. The RAM is a memory that temporarily stores results of arithmetic operations with the CPU or data input from the sensors, and the like. Also, the backup RAM is a nonvolatile memory that stores data that needs storing or the like when the engine 1 is stopped.

A plurality of sensors are connected to the ECU 100. Specifically, the ECU 100 is connected to a crank position sensor 101, a cam position sensor 102, an airflow meter 103, a throttle position sensor 104, an accelerator position sensor 105, a water temperature sensor 106, the hydraulic pressure sensor 107, an oil temperature sensor 108, a knock sensor 109, and the like. The crank position sensor 101 outputs a pulse signal every time the crankshaft 15, which is the output shaft of the engine 1, rotates by a predetermined angle. The cam position sensor 102 outputs a pulse signal every time the camshaft (for example, the intake camshaft 16a) rotates by a predetermined angle (for example, 360 degrees). The airflow meter 103 measures an intake air amount. The throttle position sensor 104 detects the opening degree of the throttle valve provided in the intake system. The accelerator position sensor 105 detects the amount of pressing of an accelerator pedal. The water temperature sensor 106 detects the temperature of the engine coolant. The hydraulic pressure sensor 107 detects the hydraulic pressure in the interior of the main oil hall 21. The oil temperature sensor 108 detects the temperature of the oil in the interior of the main oil hall 21. The knock sensor 109 detects the vibration of the engine 1 that is transmitted to the cylinder block 12 by means of a piezoelectric element (piezo element). It is noted that the knock sensor 109 of an electromagnetic type (magnet type or coil type) may be applied. Signals from these sensors 101 to 109 are inputted to the ECU 100.

It is noted that, besides the above-mentioned sensors, the ECU 100 is connected to a wheel speed sensor, a shift position sensor, a brake pedal sensor, an intake air temperature sensor, an A/F sensor, an $O_2$ sensor, and the like (any of which is not illustrated) as the known sensors, and signals from these sensors are inputted to the ECU 100.

Also, the output interface of the ECU 100 is connected to the OSV 7, a throttle motor 9 that adjusts the opening degree of the throttle valve, the injector 10, the ignition plug (specifically, the ignitor of the ignition plug) 19, variable valve timing (VVT) mechanisms 42 and 43, an MIL (Malfunction Indicator Lamp) 110 that lights up when an abnormality occurs, and the like.

Then, the ECU 100 performs the various controls of the engine 1 that include the control of fuel injection of the injector 10, the control of the ignition time of the ignition plug 19, the control of the opening degree of the throttle valve, and the like, based on the detection signals of the above-mentioned various sensors. Also, the ECU 100 performs the control (oil jet control) of the opening/closing of the OSV 7. Also, the ECU 100 performs the operation of adjusting the valve timing by means of the VVT mechanisms 42 and 43 in response to the operational state of the engine 1.

Then, regarding the switching control of the oil jet by means of the oil jet apparatus 5, during a period in which a predetermined oil jet stop condition is established, the OSV 7 is brought into ON, and the oil jet is stopped. The condition of the stoppage of the oil jet is established, for example, in a case where the engine rotation speed is equal to or less than a predetermined value, and the engine load is equal to or less than a predetermined value.

Figure 7:
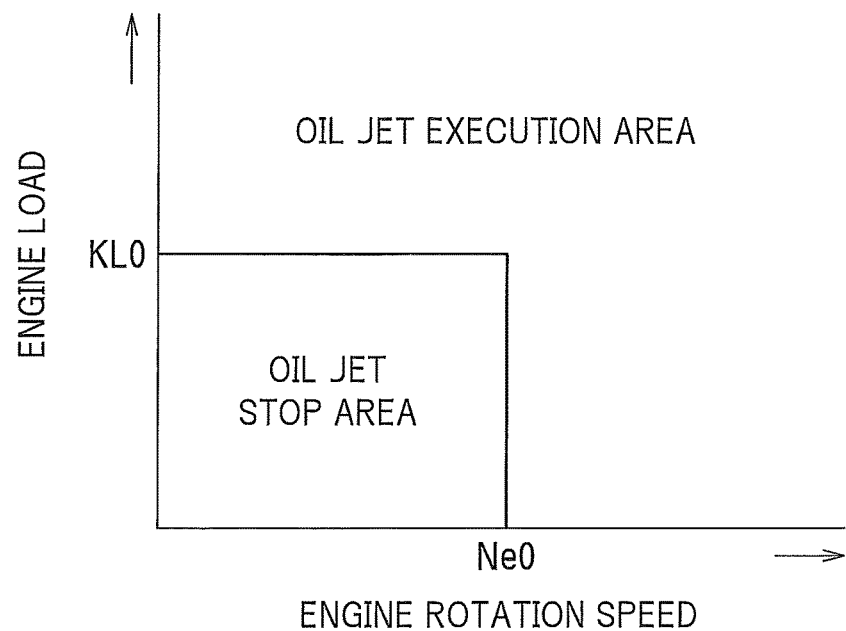
FIG. 7 is a view illustrating an oil jet execution map in which an engine rotation speed and engine load are provided as parameters.

FIG. 7 illustrates an oil jet execution map stored in the ROM of the ECU 100. In the oil jet execution map, an oil jet execution area and an oil jet stop area are set, wherein the engine rotation speed and the engine load are provided as parameters. That is, when the engine rotation speed is equal to or less than Ne0 in the diagram, and the engine load is equal to or less than KL0 in the diagram, the engine operation area is in the oil jet stop area. In this case, an oil jet stop signal is outputted from the ECU 100. Accordingly, the OSV 7 is brought into ON, and the oil jet is stopped. In contrast, when the engine rotation speed exceeds Ne0 in the diagram, or when the engine load exceeds KL0 in the diagram, the engine operation area is in the oil jet execution area. In this case, an oil jet execution signal is outputted from the ECU 100. Accordingly, the OSV 7 is brought into OFF, and the oil jet is executed.

It is noted that the values of the engine rotation speed Ne0 and the engine load KL0 are set by experiment or simulation. For example, each value is set in such a manner as to fall within a range in which the knocking does not occur during the combustion stroke of the engine 1 and appropriately maintain the temperature of the pistons 14 (in such a manner as not to excessively cool the pistons 14).

Then, when the predetermined oil jet stop condition is established, and the oil jet stop signal is outputted from the ECU 100, as described above, the OSV 7 is brought into ON, as illustrated in FIG. 8, the main valve body 83 is transferred by the energized force of the spring 85 to the side of the oil jet guiding oil path 54b (transferred to the lower side in the diagram). Following the transfer of the main valve body 83, the main valve body 83 closes the oil guiding outlet 82b of the valve housing 82. Also, the outer edge portion of the tip end portion 83d of the main valve body 83 is in contact with the inclined surface 87a of the protrusion 87 on the side of the oil guiding outlet 82b of the valve housing 82. With this contact, the valve housing 82 also receives the energized force of the spring 85. Accordingly, the valve housing 82 transfers forward to the recessed portion 55, and the tip end portion of the valve housing 82 is pressed to the bottom surface of the recessed portion 55. As a result, sealability is favorably secured between the tip end surface of the valve housing 82 and the bottom surface of the recessed portion 55, thereby preventing the oil from leaking from a gap between the tip end surface of the valve housing 82 and the bottom surface of the recessed portion 55 to the side of the piston jet nozzle 6.

—Knock Control System (KCS)—

A knock control system is installed in the ECU 100. The knock control system adjusts the ignition time of the ignition plug 19 in order to solve the knocking of the engine 1. Hereinafter, the knock control system will be described.

It is noted that, in the description below, in particular, in each arithmetic expression described later, the advance angle side of the ignition time is treated as "positive" side, and the delay angle side of the ignition time is treated as "negative" side.

The knock control system determines whether or not the knocking occurs, based on the output signal of the knock sensor 109. Then, when the knock control system determines that the knocking occurs, the knock control system changes the ignition time to the delay angle side with respect to a basic ignition time (also referred to as the most advance angle ignition time) determined in accordance with the operational state (engine load or engine rotation speed, and the like) of the engine 1. That is, the knock control system lowers the combustion speed of air-fuel mixture in the combustion chamber 18 by the delay angle of the ignition time and suppresses the maximum combustion pressure low, thereby correcting the knocking or suppressing the knocking. Also, when the knock control system determines that the knocking does not occur, the knock control system performs an ignition time control, in which the ignition time is optimized in such a manner that the ignition time is gradually advanced with respect to the basic ignition time (transfer to the ignition time of the highest combustion efficiency (a later-described MBT ignition time) or transfer to the ignition time (a later-described knock ignition time) of the most advance angle side in a range where the knocking does not occur). It is noted that the basic ignition time is calculated based on the MBT ignition time and the knock ignition time, as described later.

Specifically, when the intensity of the vibration detected by the knock sensor 109 is higher than a predetermined threshold value (a knocking determination threshold value), the knock control system determines that the knocking occurs. In contrast, when the intensity of the vibration is lower than a predetermined threshold value, the knock control system determines that the knocking does not occur. Then, a delay angle amount from the basic ignition time, that is, the correction amount of the ignition time by the knock control system is learned as a KCS learning value (hereinafter also referred to as KCS delay angle learning value in some cases) and stored in the RAM or the like.

The KCS learning value is aimed at adjusting the delay angle amount of the ignition time. When the knocking occurs, the KCS learning value is learned in such a manner that the ignition time is delayed. Specifically, the KCS learning value is calculated by gradually changing a feedback item, which is set in response to the presence or absence of the knocking, (for example, see Japanese Unexamined Patent Application Publication No. 2010-270688, Japanese Unexamined Patent Application Publication No. 2012-97595, and the like). It is noted that, as described above, herein, the delay angle side of the ignition time is treated as "negative" side, so that the KCS learning value (correction value to the delay angle side) is a negative value. That is, when the knocking occurs, it is learned in such a manner that the absolute value of the KCS learning value (the absolute value of the negative value) is set to be increased, in order to increase the delay angle amount of the ignition time. In contrast, when the knocking does not occur, it is learned in such a manner that the absolute value of the KCS learning value is set to be decreased, in order for the ignition time to be gradually advanced. Accordingly, regarding the ideal operational state of the engine 1 (for example, in a case where the later-described abnormality of the oil jet does not occur), the ignition time that is delayed only by the KCS learning value from the basic ignition time (an ignition time obtained by adding the basic ignition time to the KCS learning value (negative value)) is set as a targeted ignition time (required ignition time).

<KCS Learning Control>

Next, KCS learning control (ignition time control), in which the ignition time is adjusted while the KCS learning value is changed, will be specifically described.

The KCS learning control is the control of changing the KCS learning value in order to suppress the occurrence of the knocking of the engine 1. That is, regarding the KCS learning control, the presence or absence of the occurrence of the knocking is determined based on the output signal of the knock sensor 109, as described above, and the ignition time is delayed only by the KCS learning value from the basic ignition time based on the determination result, and the delay angle amount (KCS learning value) of the ignition time is learned.

Specifically, a map set in advance is referred based on the engine rotation speed calculated based on the output signal of the crank position sensor 101 and the intake air amount (corresponding to the engine load) obtained from the output signal of the airflow meter 103, and the basic ignition time is calculated. Also, a peak value of a knock signal from the knock sensor 109 is compared with a knocking determination threshold value, and the presence or absence of the occurrence of the knocking is determined. Then, when the presence of the occurrence of the knocking is determined, the ignition time is delayed from the basic ignition time, and the combustion speed of air-fuel mixture is lowered, and the maximum combustion pressure is suppressed low, thereby correcting the knocking. In this time, the KCS learning value is learned based on the delay angle amount (the delay angle amount from the basic ignition time) by which the knocking is corrected, and stored in the RAM or the back-up RAM. It is noted that, as described above, regarding the KCS learning control, when the knocking occurs, the delay angle amount (KCS learning value) is learned in such a manner that the ignition time is delayed. Also, when the knocking does not occur, the delay angle amount is learned in such a manner that the ignition time is gradually advanced.

Herein, the basic ignition time means an ignition time of the most advance angle side, which does not allow the occurrence of the knocking under the standard environmental conditions, based on the operational states of the engine 1, such as the engine rotation speed and the engine load (the intake air amount). Also, the engine load means required load (required generated torque) obtained based on accelerator positions, air-conditioning load, electrical load, and the like. For example, the engine load is calculated by referring to a map based on the intake air amount obtained from the output signal of the airflow meter 103. It is noted that the engine load may be calculated based on the engine rotation speed and the intake air amount.

Figure 9:
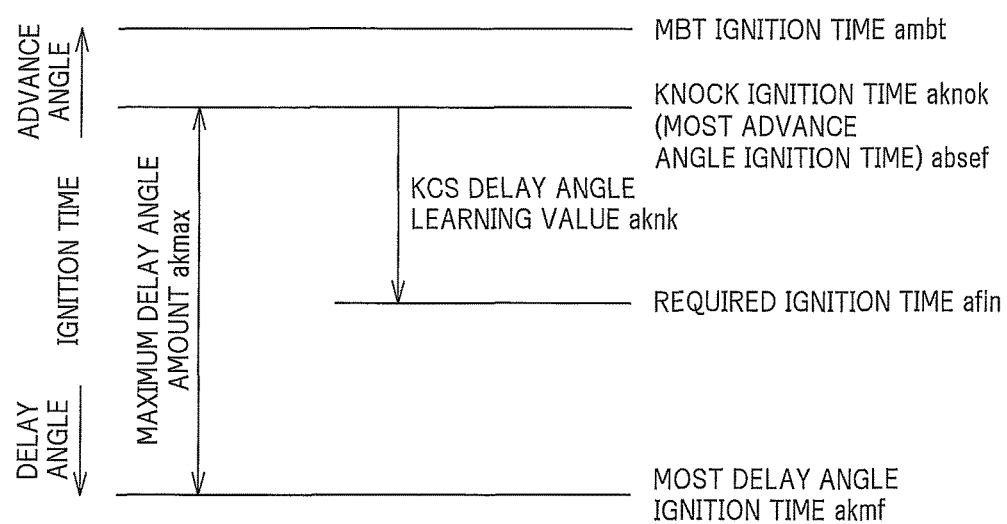
FIG. 9 is a schematic view to describe the basic operation of setting an ignition time in a knock control system.

FIG. 9 is a schematic view to describe the basic operation of setting the ignition time in the knock control system. As illustrated in FIG. 9, the ignition time control is aimed at setting a required ignition time afin, which is a control target value of the ignition time. It is noted that, herein, the ignition time is represented as an advance angle amount [°CA] of a crank angle with respect to a compression top dead center of the cylinder as an ignition target, and as described above, the advance angle side is treated as "positive" side, and the delay angle side is treated as "negative" side.

Regarding the setting of the required ignition time afin, first, a basic ignition time (most advance angle ignition time) absef, which is a limit value on the advance angle side of the setting range of the required ignition time afin with regard to the ignition time control, and a most delay angle ignition time akmf, which is a limit value on the delay angle side of the setting range, are calculated. Then, the maximum delay angle amount akmax of the required ignition time afin with respect to the most advance angle ignition time absef under knocking control is calculated based on those.

It is noted that the most delay angle ignition time akmf is set as an index value of the ignition time, at which it is possible to sufficiently keep the occurrence of the knocking within an allowable level, even under the worst condition assumed.

The maximum delay angle amount akmax is calculated by the following expression (1) by use of the most advance angle ignition time absef and the most delay angle ignition time akmf.

$$akmax = absef - akmf \quad (1)$$

The most advance angle ignition time absef is calculated based on an MBT (Minimum Advance for Best Torque) ignition time ambt and a knock occurrence ignition time (hereinafter, merely referred to a knock ignition time) aknok. Specifically, as represented in the following expression (2), a value further to the delay angle side, out of the MBT ignition time ambt and the knock ignition time aknok, is set as the most advance angle ignition time absef. As illustrated in FIG. 9, the knock ignition time aknok is on the delay angle side, with respect to the MBT ignition time ambt, and the knock ignition time aknok is set as the most advance angle ignition time absef.

$$absef = \min(ambt, aknok) \quad (2)$$

Herein, the MBT ignition time ambt represents an ignition time (maximum torque ignition time) at which the maximum torque is acquired under the present operational conditions of the engine. Also, the knock ignition time aknok represents an advance angle limitation value (knocking limitation ignition time) of the ignition time, at which the occurrence of the knocking (magnitude of knocking) can be kept within an allowable range under the most favorable conditions assumed during the use of high octane number fuel, which has a high knock limit. The MBT ignition time ambt and the knock ignition time aknok are set by referring to the setting map stored in advance in the ROM based on the present engine rotation speed Ne, the present engine load KL, and the like. The map used for setting the MBT ignition time ambt and the knock ignition time aknok is generated in advance by experiment or simulation and stored in the ROM. Also, the map includes an oil jet execution instruction time map used in a case where an oil jet execution instruction signal is outputted from the ECU 100 and an oil jet stop instruction time map used in a case where an oil jet stop instruction signal is outputted from the ECU 100. Then, the MBT ignition time ambt and the knock ignition time aknok are set in accordance with the maps selected by the instruction signals.

Figure 10:
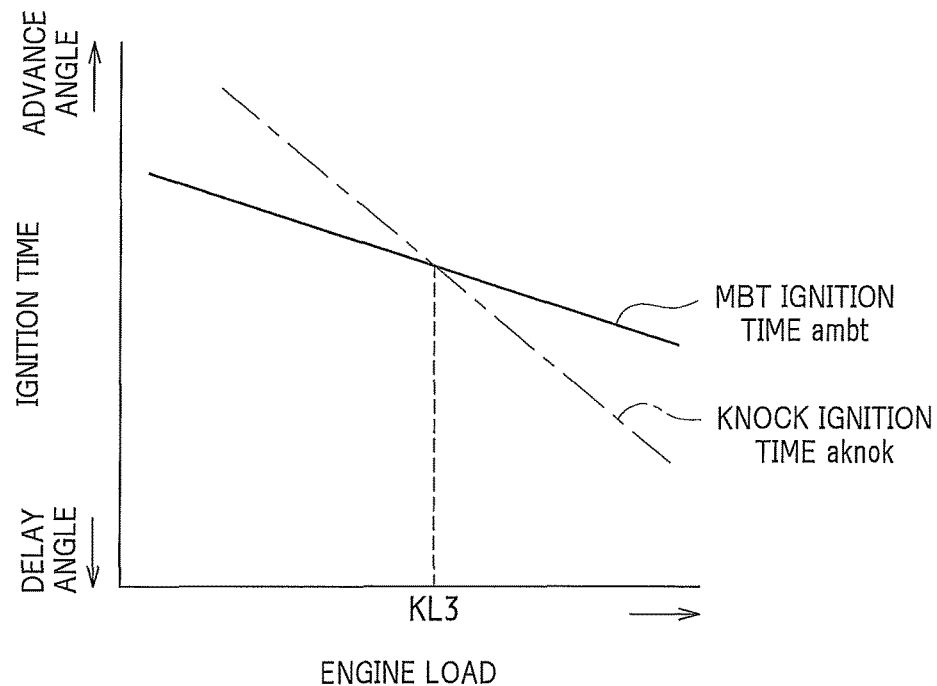
FIG. 10 is a diagram illustrating one example of the changes of an MBT ignition time and a knock ignition time in accordance with the changes of the engine load.

Also, which of the MBT ignition time ambt and the knock ignition time aknok is on the delay angle side depends on the engine load. FIG. 10 is a diagram illustrating one example of the changes of the MBT ignition time ambt and the knock ignition time aknok in response to the change of the engine load. As illustrated in FIG. 10, in an operation area where the engine load is relatively low (less than the engine load KL3 in the diagram), the MBT ignition time ambt is positioned on the delay angle side with respect to the knock ignition time aknok. Accordingly, in the operation area, the most advance angle ignition time absef corresponds to the MBT ignition time ambt. That is, in the operation area, the required ignition time afin is ideally set at a time when the ignition time is delayed only by the present KCS learning value with respect to the MBT ignition time ambt. In contrast, in an operation area where the engine load is relatively high (equal to or higher than the engine load KL3 in the diagram), the knock ignition time aknok is positioned on the delay angle side with respect to the MBT ignition time ambt. Accordingly, in the operation area, the most advance angle ignition time absef corresponds to the knock ignition time aknok. That is, in the operation area, the required ignition time afin is ideally set at a time when the ignition time is delayed only by the present KCS learning value with respect to the knock ignition time aknok.

That is, as represented in the following expression (3), the required ignition time afin is set by adding (adding a negative value) the most advance angle ignition time absef to the present KCS learning value (KCS delay angle learning value) aknk.

$$afin = absef + aknk \quad (3)$$

It is noted that the value of the KCS delay angle learning value aknk is limited in such a manner that the required ignition time afin is not set as the ignition time on the advance angle with respect to the most advance angle ignition time absef. For example, when the required ignition time afin is calculated based on the expression (3), the KCS delay angle learning value aknk is limited in such a manner as to be a value which is equal to or less than "0". Accordingly, when the KCS delay angle learning value aknk reaches a positive value, the value is set as "0".

Based on the above-mentioned ignition time control, the required ignition time afin is set to a value on the advance angle side where large torque is obtained within a range where the knocking, whose level is equal to or higher than an allowable level, does not occur.

Thus, the basic operation of the ignition time settings in the knock control system has been described.

(Oil Jet Abnormality Determination)

Next, oil jet abnormality determination, which is a characteristic operation of the present embodiment, will be described. First, the outline of the oil jet abnormality determination will be described.

As described above, regarding one wherein the oil jet switching valve 8 is opened and closed, and the execution and non-execution of the oil jet are switched, when the opening operation of the oil jet switching valve 8 is not normally performed, or when the oil path (for example, the oil jet gallery 53) for performing the oil jet is blocked, the oil jet is disabled. In this case, there occurs a failure that the cooling of the pistons 14 is not sufficiently carried out, and the like. For example, a case is assumed where the oil jet switching valve 8 is fixed in a closed state (hereinafter, referred to as closed fixation).

In view of this, the present embodiment is aimed at determining the presence or absence of the abnormality of the oil jet at an early stage with accuracy, and the presence or absence of the abnormality of the oil jet is determined based on the ignition time of the ignition plug 19. Hereinafter, the embodiment will be described.

Figure 11:
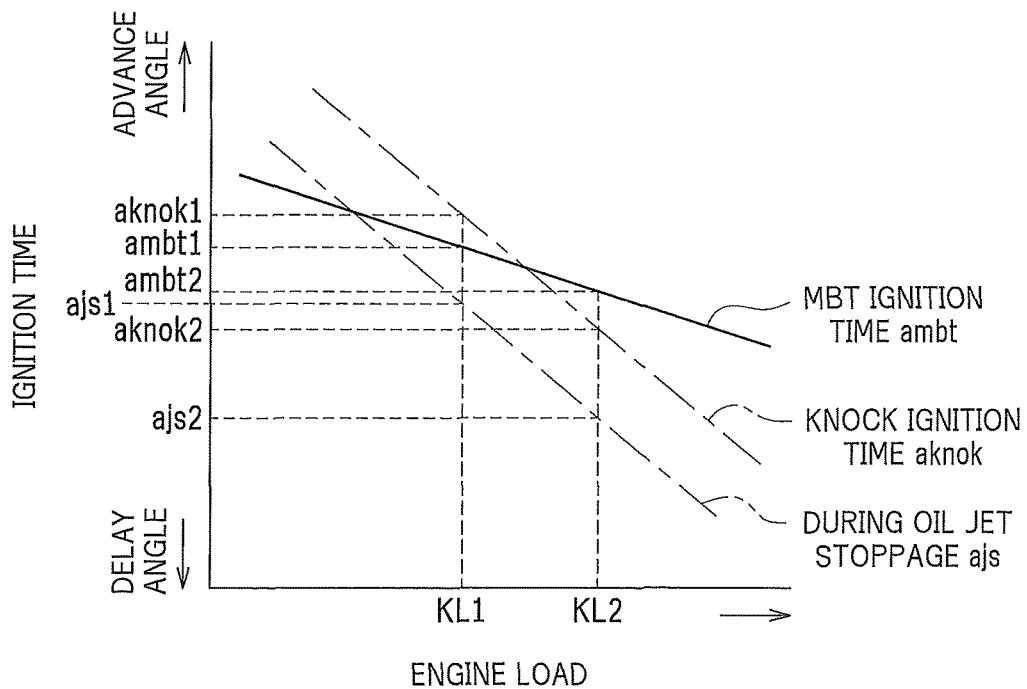
FIG. 11 is a diagram illustrating one example of the changes of an ignition time in accordance with the engine load in a state where the oil jet is disabled, along with one example of the changes of the MBT ignition time and the knock ignition time.

FIG. 11 is a diagram illustrating one example of change of an ignition time (actual the ignition time) ajs in accordance with the engine load in a state where the oil jet switching valve 8 is closed and fixed, and the oil jet is disabled (oil jet is stopped), along with one example (illustrated in FIG. 10) of the changes of the MBT ignition time ambt and the knock ignition time aknok.

As illustrated in FIG. 11, in the state where the oil jet is disabled, that is, a state where the oil jet is not performed irrespective of the oil jet execution instruction signal outputted from the ECU 100 (notwithstanding that the engine rotation speed and the engine load are in the oil jet execution area illustrated in FIG. 7), the cooling of the pistons 14 is not sufficiently carried out. Accordingly, the knocking occurs at an early time in response to an increase in the in-cylinder temperature. That is, the ignition time ajs is set further to the delay angle side with respect to the required ignition time afin (the required ignition time afin, which is delayed from the most advance angle ignition time absef only by the present KCS delay angle learning value aknk stored in the RAM) set in the ignition time control by the knock control system. That is, in the state where the oil jet is not performed, the ignition time ajs is set further to the delay angle side with respect to the original required ignition time afin (the required ignition time afin in a state where it is assumed that the oil jet is performed) set by the knock control system.

For example, when the engine load reaches KL1 in the diagram, an MBT ignition time ambt1 is positioned on the delay angle side with respect to a knock ignition time aknok1, and the most advance angle ignition time absef is set to the MBT ignition time ambt1. Then, an actual ignition time ajs1 is set on the delay angle side (further to the delay angle side with respect to the ignition time set by the KCS delay angle learning value aknk) only by the predetermined amount with respect to the most advance angle ignition time (the MBT ignition time ambt1).

Also, when the engine load reaches KL2 in the diagram, a knock ignition time aknok2 is positioned on the delay angle side with respect to an MBT ignition time ambt2, and the most advance angle ignition time absef is set to the knock ignition time aknok2. Then, an actual ignition time ajs2 is set on the delay angle side (further to the delay angle side with respect to the ignition time set by the KCS delay angle learning value aknk) only by the predetermined amount with respect to the most advance angle ignition time (the knock ignition time aknok2).

Figure 12A:
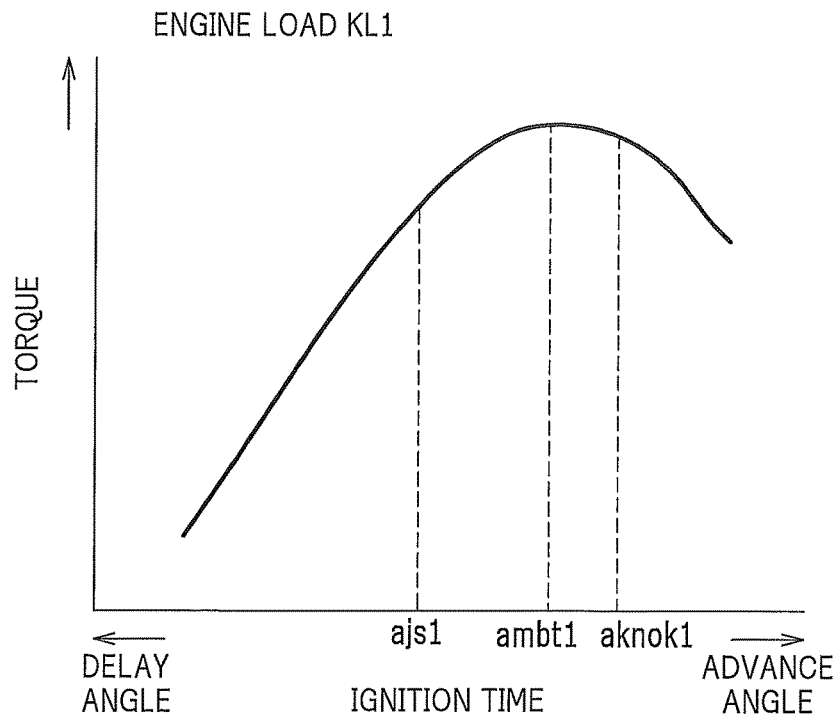
FIG. 12A is a diagram illustrating the relation of each ignition time to engine torque in a case where the engine load is KL1.

FIG. 12A is a diagram illustrating the relation of each ignition time to the engine torque in a case where the engine load is KL1. As illustrated in FIG. 12A, the knock ignition time alcnok1 is positioned on the advance angle side with respect to the MBT ignition time ambt1, which is the ignition time at which the maximum torque is obtained under the present operational conditions of the engine, and the actual ignition time ajs1 is set on the delay angle side.

Figure 12B:
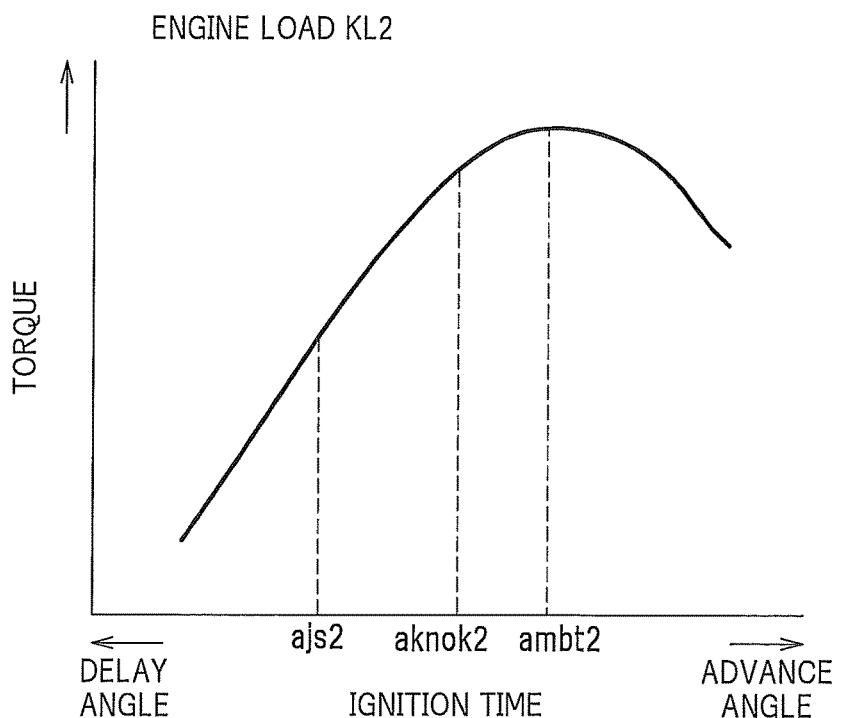
FIG. 12B is a diagram illustrating the relation of each ignition time to the engine torque in a case where the engine load is KL2.

FIG. 12B is a diagram illustrating the relation of each ignition time to the engine torque in a case where the engine load is KL2. As illustrated in FIG. 12B, the knock ignition time aknok2 is positioned on the delay angle side with respect to the MBT ignition time ambt2, which is the ignition time at which the maximum torque is obtained under the present operational conditions of the engine, and the actual ignition time ajs2 is set further to the delay angle side.

Figure 13:
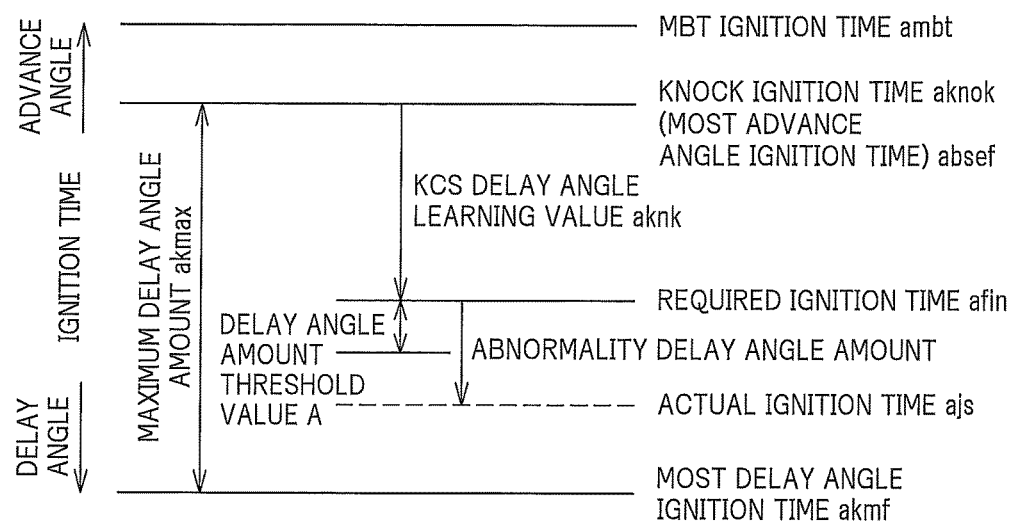
FIG. 13 is a schematic view to describe each ignition time in the case where the engine load is KL2.

Thus, the KCS delay angle learning value aknk includes a factor that the actual ignition time is set on the delay angle side with respect to the most advance angle ignition time (the MBT ignition time ambt1 in the case where the engine load is KL1 or the knock ignition time aknok2 in the case where the engine load is KL2), and as illustrated in FIG. 13 (a schematic view illustrating each ignition time in the case where the engine load is KL2), when a situation is such that the actual ignition time (actual ignition time) ajs is set further to the delay angle side with respect to the ignition time (the required ignition time afin) which is set on the delay angle side only by the present KCS delay angle learning value aknk (corresponding to "when the delay angle amount of the ignition time of the sparking plug exceeds a predetermined determination threshold value" in the present invention), it is assumed that its cause is attributed to the insufficient cooling of the pistons 14 and the occurrence of the knocking at an early time (see an abnormality delay angle amount in FIG. 13). That is, it is assumed that the oil jet is not appropriately performed. Then, in the present embodiment, in a case where the actual ignition time (actual ignition time ajs) is set further to the delay angle side with respect to the ignition time (the required ignition time afin) which is set on the delay angle side only by the KCS delay angle learning value aknk, when the delay angle amount (the abnormality delay angle amount) exceeds a predetermined threshold value (a delay angle amount threshold value A in FIG. 13), it is determined that the oil jet is not appropriately performed. In the present embodiment, the oil jet abnormality determination is performed by use of the ignition time based on the above-mentioned principle.

It is noted that it is possible to determine that the abnormality occurs in the oil jet at a time point when the actual ignition time ajs is on the delay angle side with respect to the required ignition time afin, without providing the delay angle amount threshold value A. However, in view of disturbance and other unevenness (for example, a case where an actual compression ratio is increased due to adhesion of deposits on the cylinders or the pistons 14, and the like), preferably, it is determined that the abnormality occurs in the oil jet when a deviation of the actual ignition time ajs to the required ignition time afin exceeds the delay angle amount threshold value A.

Figure 14:
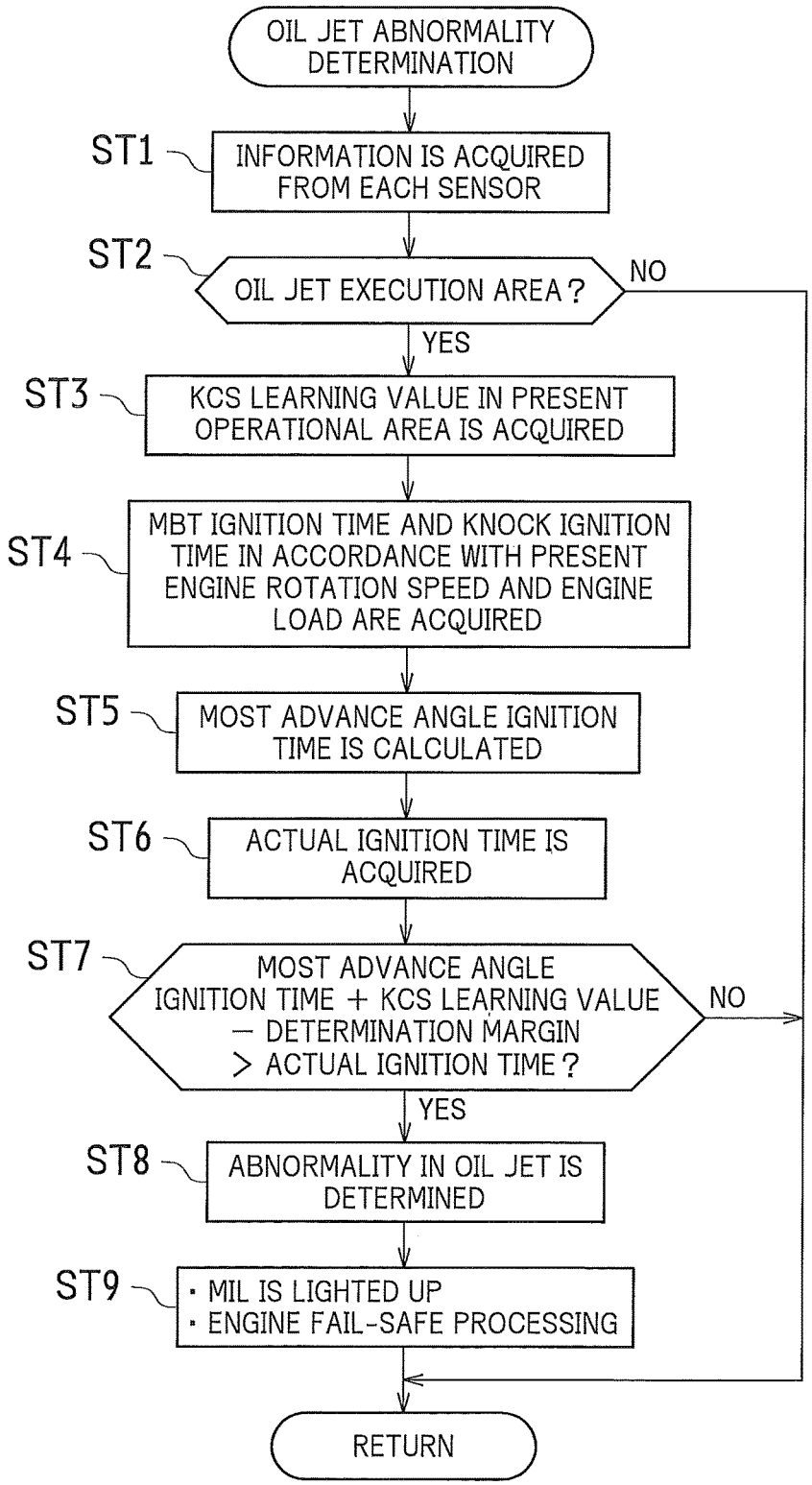
FIG. 14 is a flowchart diagram illustrating the procedures of oil jet abnormality determination.

Next, the oil jet abnormality determination will be specifically described referring to a flowchart in FIG. 14. The flowchart illustrated in FIG. 14 is executed every several milliseconds during the operation of the engine 1.

First, at Step ST1, information is acquired from each sensor. Specifically, crankshaft rotation position information from the crank position sensor 101, intake air amount information from the airflow meter 103, accelerator position information from the accelerator position sensor 105, coolant temperature information from the water temperature sensor 106, vibration information from the knock sensor 109, and the like are acquired.

Subsequently, the processing proceeds to Step ST2, it is determined whether or not the present operational area of the engine 1 is in the oil jet execution area. This determination is made by determining whether or not the engine rotation speed and the engine load are in the oil jet execution area of the oil jet execution map illustrated in FIG. 7. The engine rotation speed is calculated based on the crankshaft rotation position information from the crank position sensor 101. The engine load is acquired based on the intake air amount information from the airflow meter 103. That is, when the engine rotation speed and the engine load are in the oil jet execution area, YES is determined at Step ST2. In contrast, when the engine rotation speed and the engine load are not in the oil jet execution area, NO is determined at Step ST2.

When the engine rotation speed and the engine load are not in the oil jet execution area, and NO is determined at Step ST2, it is determined that the oil jet is not required in the present operational area of the engine 1, and the processing is returned as it is. For example, at the initial time of the start-up of the cooling the engine 1, and the like, and it is determined to be in the operational area where the oil jet needs to be stopped in order to facilitate the warm-up of the engine 1 at an early time, and the processing is returned as it is.

In contrast, when the engine rotation speed and the engine load are in the oil jet execution area, and YES is determined at Step ST2, the processing proceeds to Step ST3. In Step ST3, the KCS learning value (the KCS delay angle learning value) aknk in the present operational area is acquired. That is, the KCS learning value aknk, which has been acquired under the above-mentioned KCS learning control and stored in the RAM or the back-up RAM, is read out. The KCS learning value aknk to be read out is set to a value assumed in a case where the oil jet is performed in the present operational area.

Subsequently, the processing proceeds to Step ST4, the MBT ignition time ambt and the knock ignition time aknok in accordance with to the present engine rotation speed and engine load are acquired. Specifically, as described above, the MBT ignition time ambt and the knock ignition time aknok are extracted by applying the present engine rotation speed and engine load to the map for setting the MBT ignition time ambt and the knock ignition time aknok.

Subsequently, the processing proceeds to Step ST5, the most advance angle ignition time absef is calculated. The most advance angle ignition time absef is calculated based on the expression (2). That is, a value further to the delay angle side, out of the MBT ignition time ambt and the knock ignition time aknok, is acquired as the most advance angle ignition time absef.

Subsequently, the processing proceeds to Step ST6, the actual ignition time ajs is acquired. The actual ignition time ajs is recognized based on an ignition instruction signal from the ECU 100. Regarding the ignition time control by the knock control system described above, the ignition instruction signal from the ECU 100 is outputted from the ECU 100 in a case where the ignition time is gradually advanced in a range within which the knocking does not occur. That is, the actual ignition time ajs is acquired based on the ignition instruction signal outputted from the ECU 100.

Then, the processing proceeds to Step ST7, the KCS learning value aknk (a negative value) is added to the most advance angle ignition time absef (the most advance angle ignition time absef calculated in Step ST5), and it is determined whether or not a value (ignition time), from which a predetermined determination margin (corresponding to the delay angle amount threshold value A; a positive value) is subtracted, is larger than the actual ignition time (the actual ignition time acquired in Step ST6) (whether or not the value is on the positive side), that is, whether or not the value is on the advance angle side (see FIG. 13).

The KCS learning value aknk is a negative value at which the ignition time is transferred to the delay angle side, so that the addition of the KCS learning value aknk to the most advance angle ignition time absef leads to the calculation of the ignition time on the delay angle side only by the absolute value of the KCS learning value aknk with respect to the most advance angle ignition time absef.

Also, the determination margin (the delay angle amount threshold value A) is used to enhance the reliability of the oil jet abnormality determination as described above and determine that the abnormality occurs in the oil jet when the actual ignition time ajs exceeds a predetermined amount (the determination margin) from the ignition time (the required ignition time afin) on the delay angle side by the absolute value of the KCS learning value aknk with respect to the most advance angle ignition time absef, and the actual ignition time ajs is positioned further to the delay angle side. The determination margin is set in advance based on experiment or simulation and set in consideration of the erroneous determination factors (for example, an increase in the actual compression ratio due to adhesion of the deposits and the like) of the oil jet abnormality determination.

When NO is determined at Step ST7, it is determined that the actual ignition time ajs does not reach the delay angle amount of a case where the abnormality occurs in the oil jet, and the processing is returned as it is. That is, it is determined that the oil jet is regularly performed, and the processing is returned. In this case, the actual ignition time ajs corresponds to the required ignition time afin, or is positioned on the advance angle side with respect to the ignition time that is delayed from the required ignition time afin only by the delay angle amount threshold value A.

In contrast, when YES is determined at Step ST7, the actual ignition time ajs reaches the delay angle amount of the case where the abnormality occurs in the oil jet (see the actual ignition time ajs illustrated in FIG. 13), and it is determined that the abnormality occurs in the oil jet at Step ST8. For example, when the abnormality (for example, the closed fixation) occurs from the state where the oil jet is regularly performed, and the oil jet is stopped, the actual ignition time ajs exceeds the predetermined amount (the determination margin) from the required ignition time afin set by the KCS learning value aknk and is positioned further to the delay angle side, and YES is determined at Step ST7. Accordingly, it is determined that the oil jet is abnormal (Step ST8).

Then, at Step ST9, the MIL 110 is lighted up, so as to direct the driver's attention to inspection and maintenance. Also, the evacuation traveling (fail-safe processing of the engine 1) of the vehicle is carried out. For example, the opening degree of the throttle valve is reduced, or the fuel injection amount from the injector 10 is decreased, thereby setting the engine output low (limiting the output) and transferring to the control in which an increase in the temperature of the pistons 14 is suppressed. Also, abnormality information is written into a diagnosis provided in the ECU 100.

According to the above-mentioned operations, the determination on whether or not the abnormality occurs in the oil jet can be made with accuracy by use of the existing knock control system.

As described above, in the present embodiment, in the situation in which the actual ignition time ajs exceeds the predetermined determination threshold value (the ignition time that is delayed from the required ignition time afin only by the delay angle amount threshold value A) and is positioned to the delay angle side, the in-cylinder temperature is substantially increased, and it is determined that the cause of the increase is attributed to the lack of the oil jet amount. Then, it is determined that the function of reducing the in-cylinder temperature is not sufficiently acquired, and that the oil jet is in an abnormal state. Accordingly, it is possible to effectively utilize the existing ignition time control and accurately determine the presence or absence of the abnormality of the oil jet without using the means for detecting the hydraulic pressure and the like.

Also, regarding one wherein the oil jet switching valve 8 is provided as in the present embodiment, it is possible to switch the execution and non-execution of the oil jet as needed. For example, the oil jet is stopped at the initial time of the start-up of the cooling the engine 1, so that the improvement of the warm-up performance of the engine 1 can be achieved, and the occurrence of knocking can be prevented after the completion of the warm-up of the engine 1. However, the installation of the above-mentioned oil jet switching valve 8 leads to an increase in the number of failure-occurrence-factor sections. In the present embodiment, the failure determination on the failure-occurrence-factor sections, whose number increases, can be accurately performed. Accordingly, the present embodiment can solve a disadvantage in that the oil jet switching valve 8 is provided and enhance practicality in that the oil jet switching valve 8 is provided.

—Modification—

Next, a modification will be described. In the modification, when it is determined that an abnormality occurs in the oil jet, the state of the abnormality is further specified.

Specifically, this is aimed at discriminating between the closed fixation and the opened fixation of the oil jet switching valve 8. The closed fixation of the oil jet switching valve 8 represents a state where the oil jet switching valve 8 is fixed in a closed state, and the supply of the oil to the oil jet apparatus 5 cannot be carried out. Also, the opened fixation of the oil jet switching valve 8 represents a state where the oil jet switching valve 8 is fixed in a opened state, and the supply of the oil to the oil jet apparatus 5 is carried out at all times.

Figure 15:
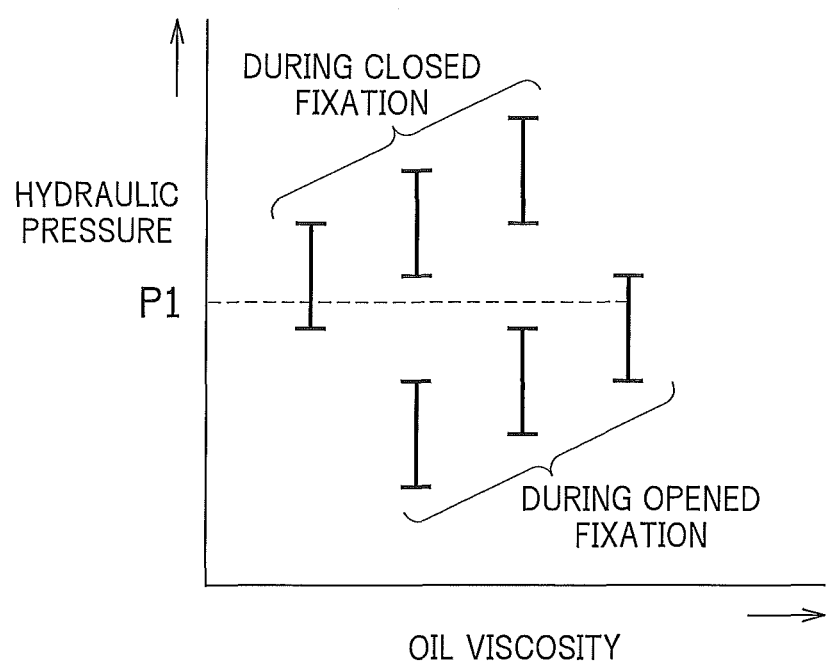
FIG. 15 is a view illustrating one example of the relation of oil viscosity to hydraulic pressure when the valve of the oil jet apparatus is closed and fixed, and when the valve of the oil jet apparatus is opened and fixed.

FIG. 15 illustrates the width of change in the hydraulic pressure in accordance with oil viscosity during the closed fixation and the opened fixation. In this case, when the hydraulic pressure detected by the hydraulic pressure sensor 107 is represented as P1 in the diagram, it is impossible to discriminate between the closed fixation and the opened fixation. This is because, in the situation in which the hydraulic pressure is P1, the hydraulic pressure has a possibility of generating the fixation in any of a case where the closed fixation occurs in a state of low oil viscosity or a case where the opened fixation occurs in a state of high oil viscosity. Thus, it is impossible to discriminate between the closed fixation and the opened fixation only by detecting the hydraulic pressure.

Figure 16:
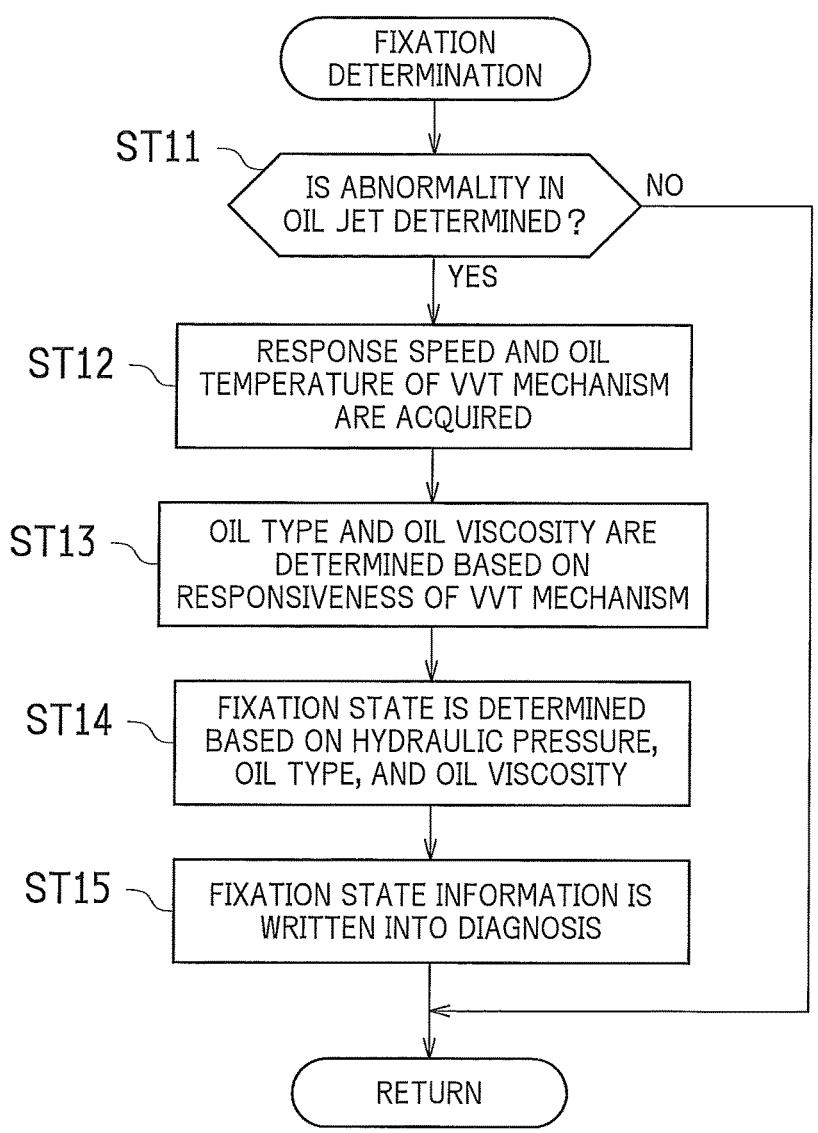
FIG. 16 is a flowchart diagram illustrating the procedures of determining the fixation in a modification.

In the modification, not only the hydraulic pressure but also oil type and oil viscosity are acquired, and the closed fixation and the opened fixation are discriminated based on those. Hereinafter, the modification will be specifically described referring to a flowchart in FIG. 16. The flowchart illustrated in FIG. 16 is executed every several milliseconds during the operation of the engine.

First, at Step ST11, it is discriminated whether or not it is determined that the abnormality occurs in the oil jet. This determination is made in a similar manner as that of the above-mentioned embodiment.

When the abnormality does not occur in the oil jet, NO is determined at Step ST11, and the processing is returned as it is.

In contrast, when the abnormality occurs in the oil jet, and YES is determined at Step ST11, and the processing proceeds to Step ST12. At Step ST12, a response speed in a case where the operation of adjusting the valve timing is carried out by means of the VVT mechanisms 42 and 43, and a present oil temperature are acquired. Based on the output of the cam position sensor 102, the response speeds of the VVT mechanisms 42 and 43 are calculated based on a difference (phase difference) between a present valve timing and a target valve timing, and a time until the target valve timing is reached. Also, the present oil temperature is detected by the oil temperature sensor 108.

At Step ST13, the oil type and oil viscosity of the hydraulic oil are acquired based on the responsiveness of the VVT mechanisms 42 and 43. For example, it is included that these relations are stored in advance in the ROM as a map and the oil type and the oil viscosity are acquired from the map.

Subsequently, the processing proceeds to Step ST14, the fixation state of the oil jet switching valve 8 is determined based on the hydraulic pressure, the oil type, and the oil viscosity. Regarding this determination, the relations of the fixation state of the oil jet switching valve 8 (discrimination of the closed fixation from the opened fixation) to the hydraulic pressure, the oil type, and the oil viscosity are mapped by experiment or simulation in advance, and the information on the hydraulic pressure, the oil type, and the oil viscosity is applied to the map, thereby determining the fixation state of the oil jet switching valve 8.

Subsequently, the processing proceeds to Step ST15, information on the fixation state of the oil jet switching valve 8 is written into the diagnosis provided in the ECU 100.

According to the modification, the fixation state of the oil jet switching valve can be determined. Accordingly, it is possible to take measures (which measures should be taken, with regard to any of the measure taken in the case of the closed fixation and the measure taken in the case of the opened fixation) for solving the failure at an early time.

—Other Embodiment—

In the embodiment and the modification described above, the case has been described where the present invention is applied to the inline four-cylinder gasoline engine. Regarding the present invention, the number of cylinders and types of engines (V-type, horizontally opposed type, and the like) are specifically not limited. Also, the present invention can be applied to the diesel engine.

Also, in the embodiment and the modification, the OSV 7 is provided in the oil jet switching mechanism 52. The present invention is not limited to this, but an OCV (Oil Control Valve) that can adjust opening degrees may be provided.

Also, in the embodiment and the modification, the case has been described wherein the present invention is applied to a conventional vehicle (a vehicle in which only the engine 1 is mounted as a drive power source), but the present invention can be applied to a hybrid vehicle (a vehicle in which an engine and an electric motor are mounted as the drive power source).

Also, in the embodiment and the modification, the case has been described wherein the present invention is applied to the oil jet apparatus 5 that cools the pistons 14, but the present invention can be applied to an oil jet apparatus that cools the inner wall surface of the cylinders.

Also, in the embodiment, the oil jet abnormality determination is performed in accordance with the flowchart in FIG. 14 every predetermined time during the operation of the engine 1. The present invention is not limited to this, but the oil jet abnormality determination may be performed only in a predetermined period during the operation of the engine 1. For example, it may be such that the operational state of the engine is transferred from the oil jet stop area to the oil jet execution area illustrated in FIG. 7, and the oil jet abnormality determination is started from a time point when the oil jet execution instruction signal is outputted from the ECU 100.

INDUSTRIAL APPLICABILITY

The present invention can be applied to abnormality determination such as closed fixation in an oil jet switching valve of an oil jet apparatus mounted in an engine.

REFERENCE SIGNS LIST

1 Engine (Internal combustion engine)
18 Combustion chamber
19 Ignition plug (Sparking plug)
2 Oil jet apparatus
8 Oil jet switching valve
100 ECU

The invention claimed is:

1. An oil jet abnormality determination apparatus of an internal combustion engine that is configured to perform an oil jet that lowers an in-cylinder temperature, the oil jet abnormality determination apparatus comprising:
a control unit configured to determine an occurrence of knocking and perform an ignition time control in which an ignition time of a sparking plug is set to a delay angle side of a crank angle when knocking occurs,
wherein, when a delay angle amount of the ignition time of the sparking plug exceeds a predetermined determination threshold value, the control unit is configured to:
determine that an abnormal state occurs, the abnormal state where an oil jet is not executed irrespective of an oil jet execution instruction; and
output a determination result, and
wherein the control unit is further configured to:
compare an actual ignition time with a required ignition time, which is delayed only by a KCS learning value that is learned in such a manner as to correct the knocking during occurrence of the knocking, with respect to a basic ignition time of the sparking plug, which is set based on an operational state of the internal combustion engine; and
determine that the abnormal state occurs when a deviation of the actual ignition time to a delay angle side with respect to the required ignition time exceeds a predetermined amount.

2. The oil jet abnormality determination apparatus according to claim 1,
wherein the basic ignition time of the sparking plug is set as an ignition time on the delay angle side, out of an MBT ignition time, which is an ignition time at which maximum torque is acquired under present operational conditions of the internal combustion engine, and a knock ignition time, which is an advance angle limitation value of an ignition time at which a magnitude of the knocking can be kept within an allowable level.

3. The oil jet abnormality determination apparatus according to claim 1,
wherein an oil jet switching valve is provided on an oil path for performing the oil jet, the oil jet switching valve, when the operational state of the internal combustion engine is in an oil jet execution area, configured to be opened in response to an open instruction signal, and when the operational state of the internal combustion engine is in an oil jet stop area, configured to be closed in response to a closed instruction signal, and
wherein, notwithstanding that the open instruction signal is outputted, when the delay angle amount of the ignition time of the sparking plug exceeds the predetermined determination threshold value, the control unit is configured to determine that the abnormal state occurs.

4. A control apparatus of an internal combustion engine, wherein, when it is determined by the oil jet abnormality determination apparatus according to claim 1 that the abnormal state occurs, the control unit is configured to limit output of the internal combustion engine.

5. An oil jet abnormality determination apparatus of an internal combustion engine that is configured to perform an oil jet that lowers an in-cylinder temperature, the oil jet abnormality determination apparatus comprising:
a control unit configured to determine an occurrence of knocking and perform an ignition time control in which an ignition time of a sparking plug is set to a delay angle side of a crank angle when knocking occurs,
wherein, when a delay angle amount of the ignition time of the sparking plug exceeds a predetermined determination threshold value, the control unit is configured to:
determine that an abnormal state occurs, the abnormal state where an oil jet is not executed irrespective of an oil jet execution instruction; and output a determination result,
wherein an oil jet switching valve is provided on an oil path for performing the oil jet, the oil jet switching valve, when the operational state of the internal combustion engine is in an oil jet execution area, configured to be opened in response to an open instruction signal, and when the operational state of the internal combustion engine is in an oil jet stop area, configured to be closed in response to a closed instruction signal,
wherein, notwithstanding that the open instruction signal is outputted, when the delay angle amount of the ignition time of the sparking plug exceeds the predetermined determination threshold value, the control unit is configured to determine that the abnormal state occurs,
wherein a variable valve timing mechanism is provided in the internal combustion engine, and
wherein when oil jet abnormality determination is made, it is configured to acquire oil type and oil viscosity from a response time of the variable valve timing mechanism and determine a fixation state of the oil jet switching valve based on the oil type, the oil viscosity, and hydraulic pressure detected.

* * * * *